United States Patent
Jia et al.

(10) Patent No.: US 12,149,570 B2
(45) Date of Patent: Nov. 19, 2024

(54) ACCESS CONTROL OF AUDIO AND VIDEO STREAMS AND CONTROL OF REPRESENTATIONS FOR COMMUNICATION SESSIONS

(71) Applicant: MICROSOFT TECHNOLOGY LICENSING, LLC, Redmond, WA (US)

(72) Inventors: Yichen Jia, Kirkland, WA (US); Samuel Chung, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/092,061

(22) Filed: Dec. 30, 2022

(65) Prior Publication Data
US 2024/0223625 A1    Jul. 4, 2024

(51) Int. Cl.
  G06F 3/0482 (2013.01)
  H04L 9/40 (2022.01)
  H04L 65/1093 (2022.01)

(52) U.S. Cl.
  CPC ........ *H04L 65/1093* (2013.01); *G06F 3/0482* (2013.01); *H04L 63/102* (2013.01); *H04L 63/104* (2013.01)

(58) Field of Classification Search
  CPC . H04L 65/1093; H04L 63/102; H04L 63/104; G06F 3/0482
  See application file for complete search history.

(56) References Cited

U.S. PATENT DOCUMENTS

| | | | |
|---|---|---|---|
| 6,559,863 B1 * | 5/2003 | Megiddo | H04N 7/15 348/E7.083 |
| 6,772,195 B1 * | 8/2004 | Hatlelid | G06F 3/04815 709/224 |

(Continued)

FOREIGN PATENT DOCUMENTS

| | | |
|---|---|---|
| EP | 2538610 B1 | 12/2018 |
| WO | 2022025143 A1 | 2/2022 |

OTHER PUBLICATIONS

Dave Johnson, How to join a Webex meeting from your computer, the mobile app, or a phone call, retrieved from—https://www.businessinsider.com/guides/tech/how-to-join-webex-meeting, Aug. 27, 2020, 8 pages (Year: 2020).*

(Continued)

*Primary Examiner* — Yongjia Pan
(74) *Attorney, Agent, or Firm* — Scott Y. Shigeta; Newport IP, LLC

(57) ABSTRACT

The disclosed techniques provide features for managing conference user interfaces and access rights to content teams for event subgroups. Movement of an avatar or a user representation in a user interface and selective audio streaming can be achieved in response to a selection of a command, e.g., a "listen" command, corresponding to a specific subgroup from a list on a side panel. The disclosed techniques include a number of types of commands that are used to control the movement of an avatar and control access to a number of select audio streams for a computer of a user. The system moves the avatar from an original position to a second position near or within a graphical representation of the subgroup in response to the command. Access to audio streams can be modified to be bidirectional or unidirectional in response to the command.

20 Claims, 26 Drawing Sheets

(56) References Cited

U.S. PATENT DOCUMENTS

| | | | |
|---|---|---|---|
| 7,346,654 B1* | 3/2008 | Weiss | H04N 7/15 |
| | | | 348/E7.083 |
| 7,478,129 B1* | 1/2009 | Chemtob | H04L 65/4038 |
| | | | 709/204 |
| 8,244,830 B2 | 8/2012 | Robinson et al. | |
| 9,077,549 B2* | 7/2015 | Moyers | H04L 12/1818 |
| 10,952,006 B1 | 3/2021 | Krol et al. | |
| 10,966,062 B1* | 3/2021 | Nugumanov | H04W 4/21 |
| 2007/0299710 A1* | 12/2007 | Haveliwala | G06Q 10/10 |
| | | | 705/7.19 |
| 2009/0254842 A1* | 10/2009 | Leacock | G06F 3/04815 |
| | | | 715/757 |
| 2009/0254843 A1* | 10/2009 | Van Wie | H04L 67/131 |
| | | | 707/999.005 |
| 2009/0288007 A1* | 11/2009 | Leacock | G06Q 10/10 |
| | | | 715/757 |
| 2015/0256353 A1* | 9/2015 | Busey | H04L 63/0421 |
| | | | 715/758 |
| 2018/0359293 A1 | 12/2018 | Faulkner et al. | |
| 2020/0112450 A1* | 4/2020 | Chhabra | H04L 65/403 |
| 2020/0201516 A1* | 6/2020 | Labey | G06F 3/04815 |
| 2021/0168178 A1* | 6/2021 | Bhamidipati | H04L 65/1069 |
| 2021/0352244 A1* | 11/2021 | Benedetto | H04N 7/15 |
| 2021/0400142 A1* | 12/2021 | Jorasch | H04N 21/4781 |
| 2022/0086203 A1* | 3/2022 | Morris | H04N 7/157 |
| 2022/0124130 A1* | 4/2022 | Punwani | H04N 7/157 |
| 2022/0124285 A1* | 4/2022 | Punwani | H04L 12/1822 |
| 2022/0147225 A1* | 5/2022 | Freisthler | H04L 51/046 |
| 2022/0321370 A1* | 10/2022 | Skuratowicz | H04L 12/1822 |
| 2022/0321507 A1* | 10/2022 | Skuratowicz | G06F 3/0481 |
| 2023/0085567 A1* | 3/2023 | Gal | H04L 12/1827 |
| 2023/0156155 A1* | 5/2023 | Zhang | H04L 12/1827 |
| | | | 709/204 |
| 2023/0156157 A1* | 5/2023 | Zhang | H04L 12/1827 |
| | | | 709/204 |

OTHER PUBLICATIONS

"Bridge distances through dialogues", Retrieved from: https://web.archive.org/web/20220326131226/https://www.airmeet.com/hub/networking/, Retrieved Date: Aug. 10, 2022, 7 Pages.

"Great Resignation, meet Great Reconnection", Retrieved from: https://web.archive.org/web/20220801135512/https://watercoolr.shindig.com/, Aug. 1, 2022, 8 Pages.

"Wonder", Retrieved from: https://web.archive.org/web/20220501000000*/https://www.wonder.me/, Aug. 10, 2022, 7 Pages.

Diaz, et al., "Making Space for Social Time: Supporting Conversational Transitions Before, During, and After Video Meetings", In Proceedings of Symposium on Human-Computer Interaction for Work, Jun. 8, 2022, 11 Pages.

Riedl, et al., "Online Mingling: Supporting Ad Hoc, Private Conversations at Virtual Conferences", In Proceedings of Conference on Human Factors in Computing Systems, May 2021, 10 Pages.

Rogers, et al., "BubbleVideo: Supporting Small Group Interactions in Online Conferences", In Proceedings of International Conference on Human-Computer Interaction, Aug. 26, 2021, 11 Pages.

Thillman, Jason, "Setting up Your Space", Retrieved from: https://help.wonder.me/en/articles/5622035-step-4-setting-up-your-space, Retrieved Date: Aug. 8, 2022, 4 Pages.

International Search Report and Written Opinion received for PCT Application No. PCT/US23/036067, mailed on Feb. 12, 2024, 15 pages.

* cited by examiner

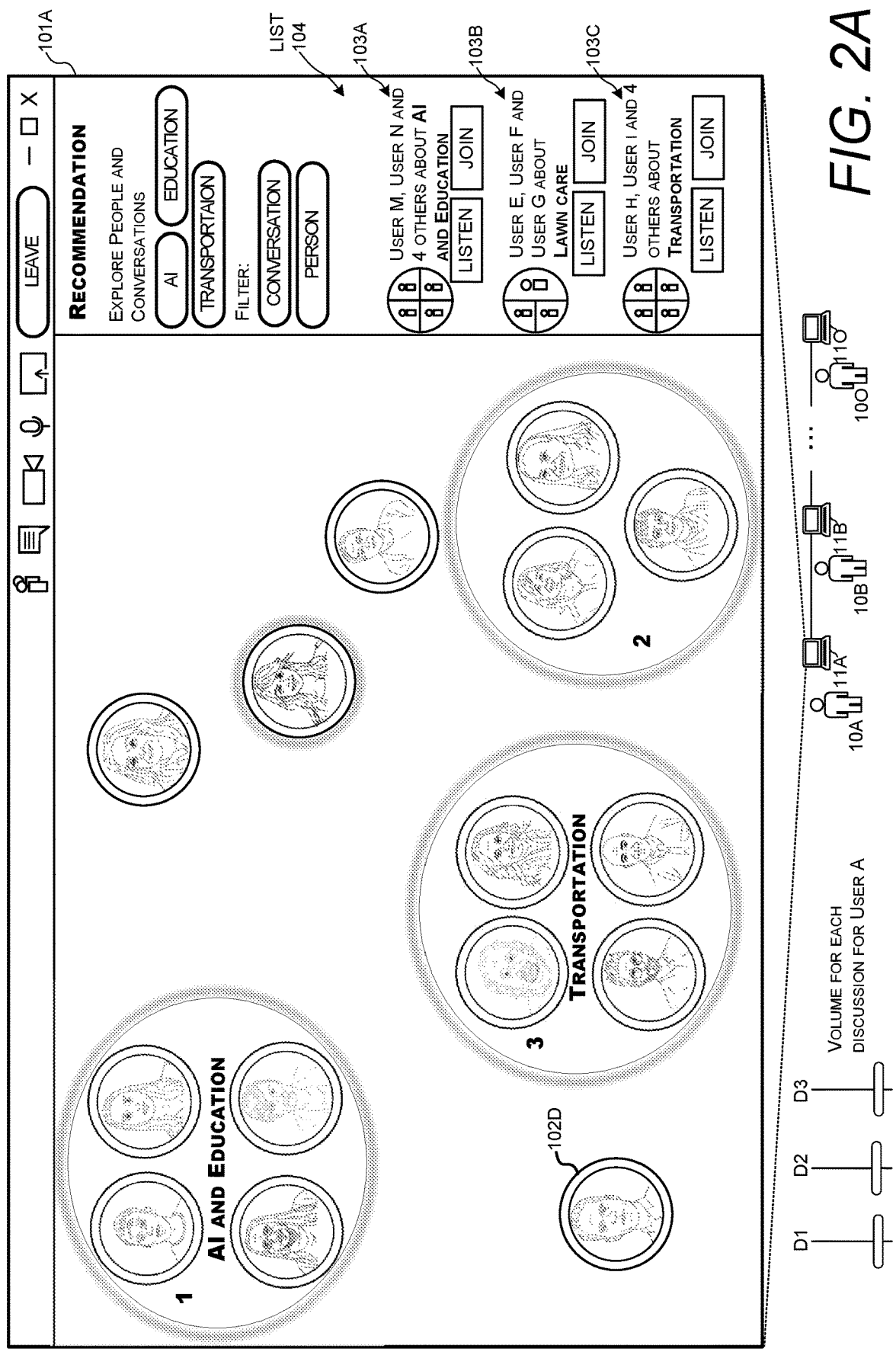

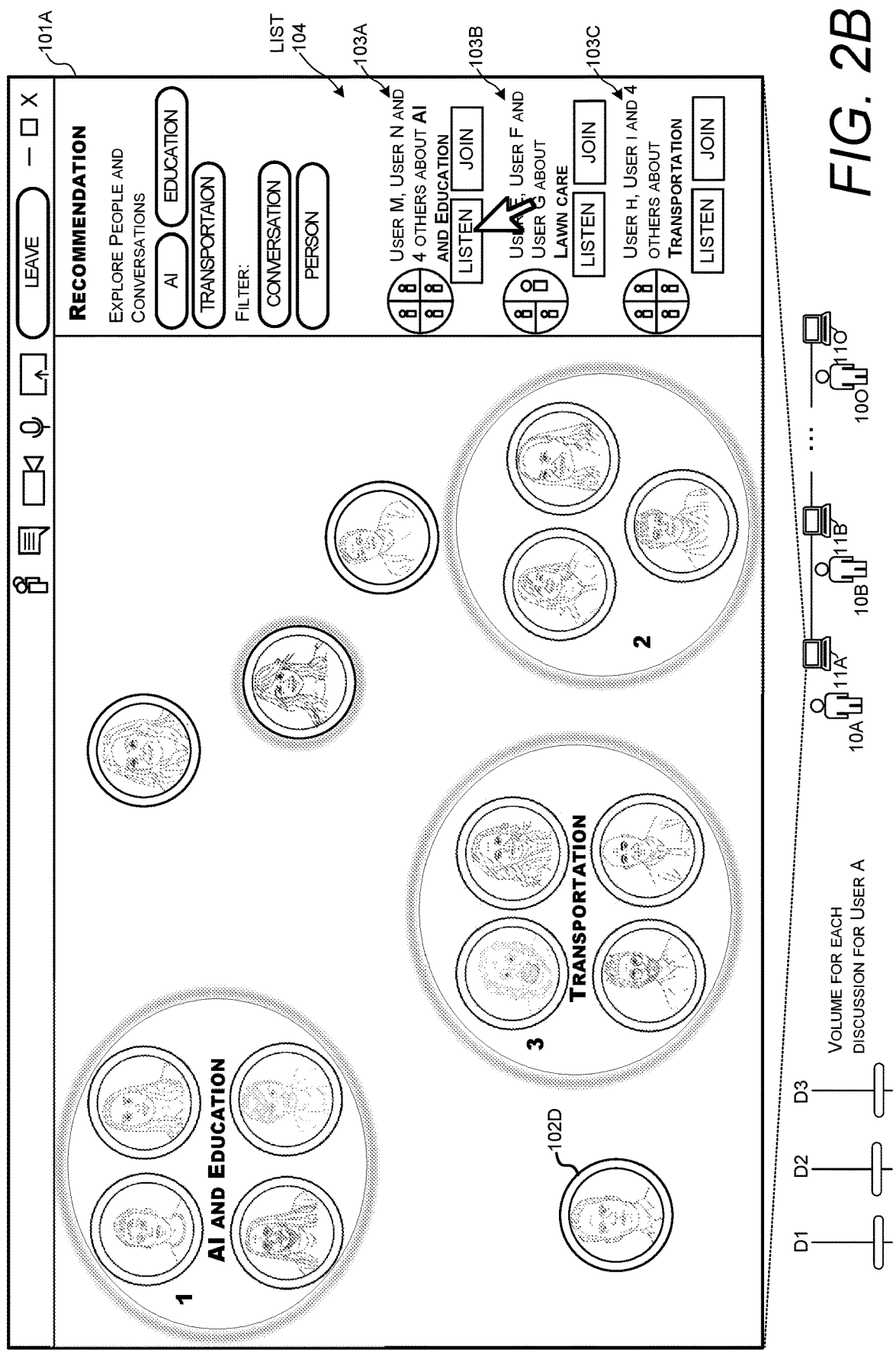

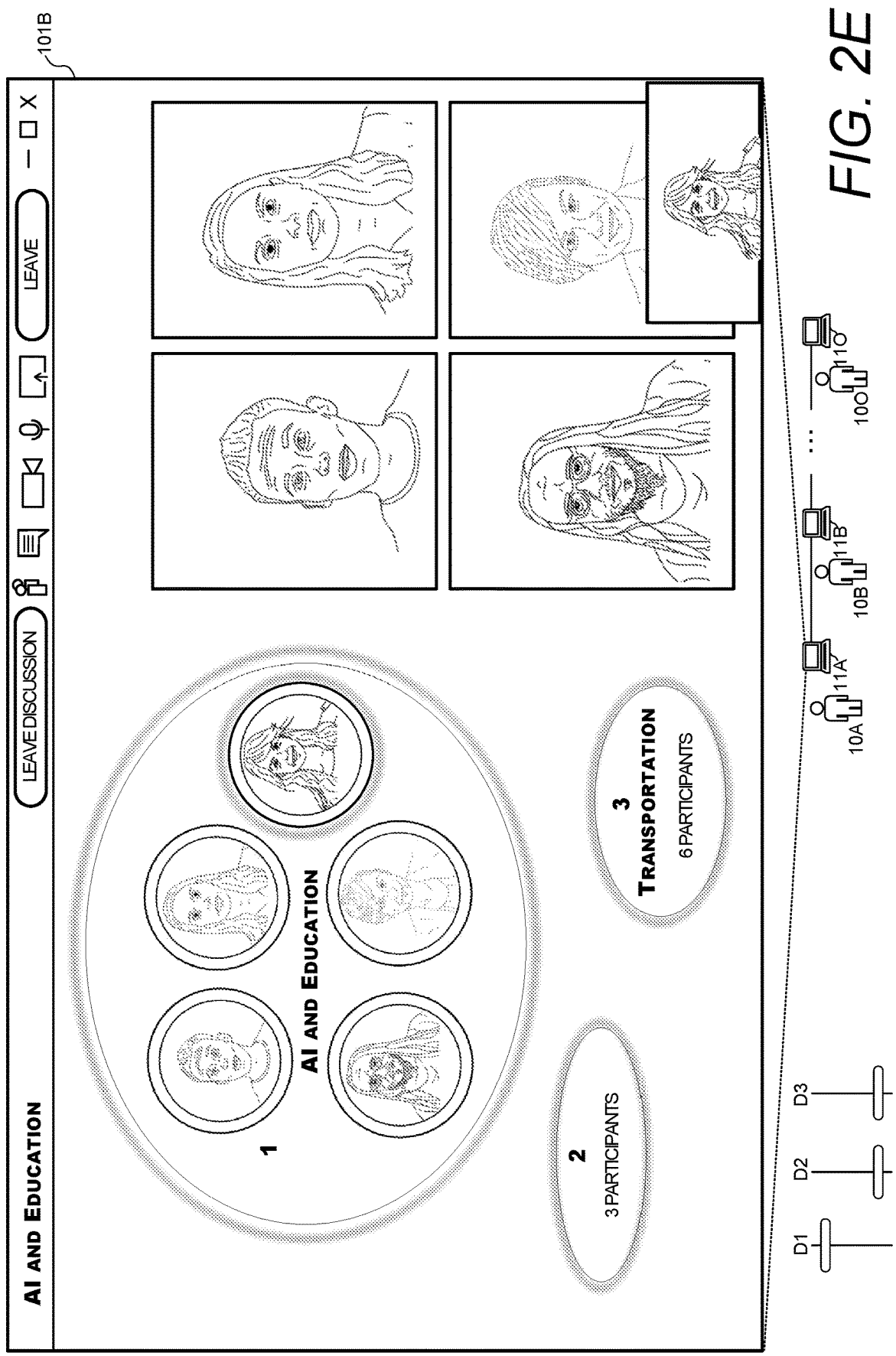

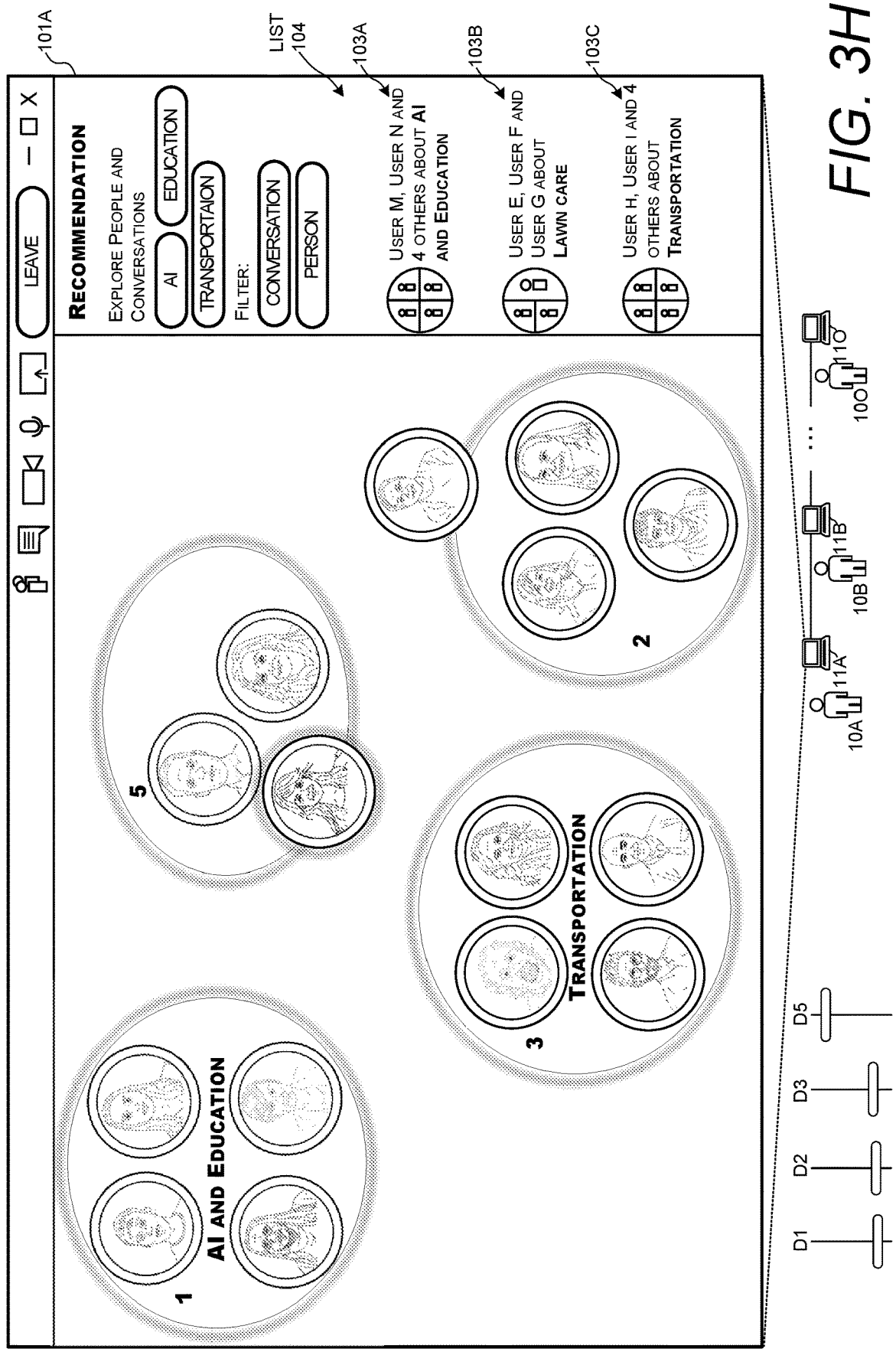

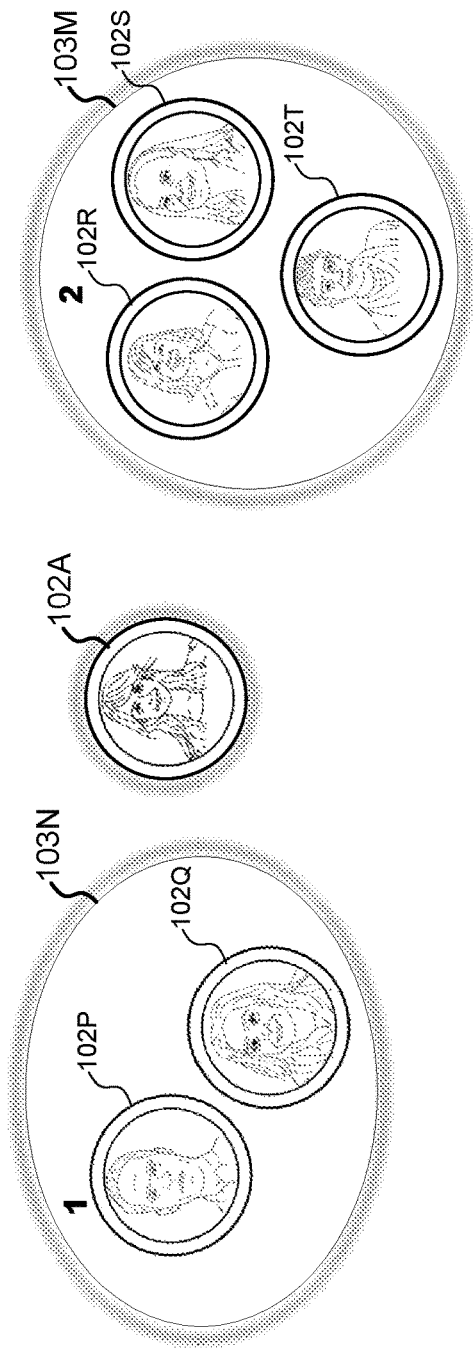

ACCESS CONTROL OF AUDIO AND VIDEO STREAMS AND CONTROL OF REPRESENTATIONS FOR COMMUNICATION SESSIONS

BACKGROUND

There are a number of different types of collaborative systems that allow users to communicate. For example, some systems allow people to collaborate by sharing content using video and audio streams, shared files, chat messages, etc. Some systems provide user interface formats that allow users to share content with an audience. Such systems can provide specific sets of permissions that allow users to take specific roles, such as a presenter, audience member, etc.

Although some collaborative systems can provide a platform for a number of users to share live video streams and audio streams using specific sets of permissions for users to take on certain roles, such systems have a number of drawbacks. For instance, when the communication session involves a number of different private breakout sessions, a user must take a number of different manual steps to search for a breakout session of interest and then take a number of manual steps to enter an individual breakout session. In one illustrative example, a meeting involving twenty people may have four breakout sessions: a first group involving five people may be engaged in a private chat session discussing remodeling, a second group of involving 5 people may be engaged in a private chat session discussing new homes, a third group of four people may be engaged in a private chat session discussing office buildings, and a fourth group of six people may be engaged in a private chat session discussing lease contracts. In order for an individual to leave a group and join another private discussion, that person would have to take a number of manual steps to leave the group, search for another group of interest, and then enter that private discussion. Not only do these manual steps cause a number of inefficiencies, but this manual process can also lead to security issues.

In some existing systems, security issues are created when a user joins a group discussion or a breakout group. To join a group, a user may have to send a request to an administrator or group leader. The administrator may have to take a number of manual steps to change the permissions for the requesting user. Then when the person leaves the group, those permissions may have to be changed back to an original state. This type of process that involves manual entry to control access to files and to control audio and video streams can lead to security issues because a person may make a mistake by an inverting input or permissions may be inadvertently left in an undesired state.

SUMMARY

The techniques disclosed herein provide features for managing conference user interfaces for event subgroups. Movement of an avatar or a user representation in a user interface and selective audio streaming can be achieved in response to a selection of a command, e.g., a "listen" command, corresponding to a specific subgroup from a list on a side panel. The disclosed techniques include a number of types of commands that are used to control the movement of an avatar and control access to a number of select audio streams for a computer of a user. The visual representation of a user in a "listen" state and the selective transmission of corresponding audio signals are controlled in response to specific commands provided by the user, including but not limited to a voice instruction or a pointer input selection of a discussion of a subgroup of a meeting. The command can control the avatar and access to signals when the command identifies: a person in the group, a topic being discussed, a subgroup of people in a meeting in a list, a reference to shared content of the subgroup of users, etc.

The avatar position can be moved from an original position to a second position near or within a graphical representation of the subgroup in response to the command. The system also grants access to the audio streams generated by computers of the subgroup members in response to the command. The avatar position can be moved back to an original position or moved out of a graphical representation of the subgroup when the user provides a second command, e.g., a leave discussion command. In addition, the system also revokes access to the audio streams generated by computers of the subgroup members in response to the second command. The access to the streams can also control access to shared content, e.g., files that are shared between people of a subgroup. Other commands cause the system to change access rights to video streams and targeted control of audio streams. Operating states can change from a listen only operating mode where audio streams can be communicated unidirectionally to full join mode where audio and video streams can be communicated bidirectionally.

These features provide increased security by automatically controlling access permissions to shared content and streams. This eliminates the need for a user to provide requests or manual entries to change access permissions and change the access permissions back to an original state. This can avoid situations where access permissions are inadvertently left in an undesirable state and also eliminates inadvertent inputs and errant permissions, which can lead to exposure of many different attack vectors.

The automatic graphical adjustments can also provide a number of technical benefits for computing systems. For instance, by providing adaptive adjustments of graphical representations, each user of a communication session can gain the benefit of group activity by gaining a better context of a current situation. By providing this more detailed information and user stimulus, a system can promote user engagement help a system to reduce user fatigue. By reducing user fatigue, particularly in a communication system, users can more effectively exchange information. This helps mitigate occurrences where shared content is missed or overlooked. This can reduce occurrences where users need to re-send information. More effective communication of shared content can also help avoid the need for external systems, such as mobile phones for texting and other messaging platforms. The system and features described herein can also help reduce the duplicative use of network, processor, memory, or other computing resources.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2A shows a user interface in a first stage of a process for providing access control of audio and video streams and control of representations for communication sessions.

FIG. 2B shows a user interface in a second stage of a process for providing access control of audio and video streams and control of representations for communication sessions, wherein the user interface shows one form of an input command.

FIG. 2E shows a user interface in a fifth stage of a process for providing access control of audio and video streams and control of representations for communication sessions, wherein the user interface shows the result of the second command for controlling video streams and additional access to video streams.

FIG. 3H shows a user interface in a second stage of a process for providing access control of audio and video streams in response to movement of representations for communication sessions, where one representation of a person is moving towards a representation of a discussion.

FIG. 4A shows aspects of a first output of controlled spatial audio signals based on a first set of locations of representations on a user interface.

DETAILED DESCRIPTION

Figure 1:
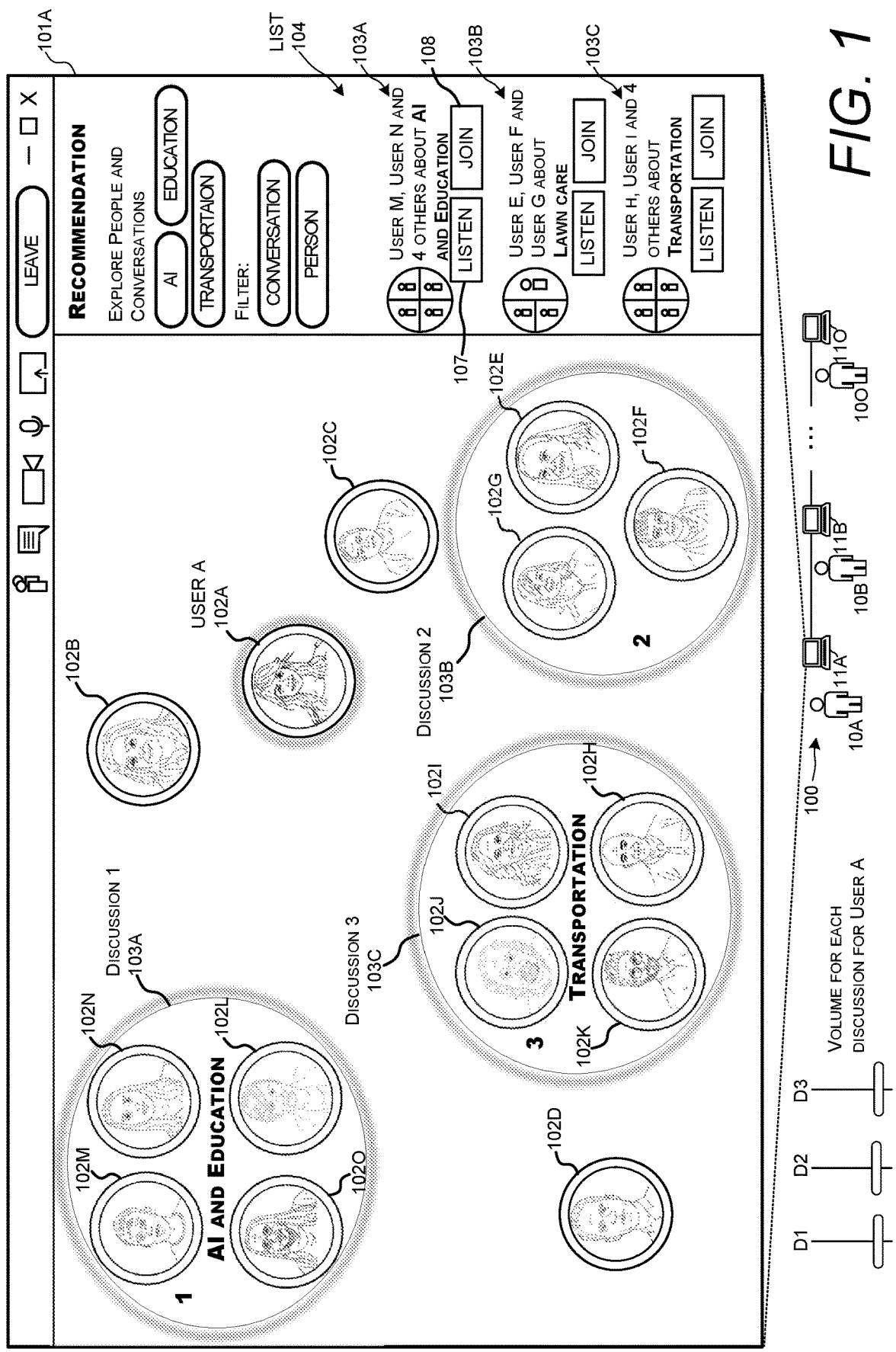
FIG. 1 is a diagram of a user interface and a system for providing access control of audio and video streams and control of representations for communication sessions.

FIG. 1 illustrates a system 100 that controls access to audio and video streams and controls representations indicating modifications to the access to the audio and video streams. A communication session can be in the form of an online meeting where video streams and audio streams are shared between users 10 of the system 100. The system 100 can include a number of computers 11 each corresponding to individual users 10. For illustrative purposes, a first user 10A is associated with a first computer 11A, a second user 10B is associated with a second computer 11B, and other users are associated with other individual computers, up to User 10O, who is associated with a computer 10O. These users can also be respectively referred to as "User A," User B," etc. This example is provided for illustrative purposes and it is not to be construed as limiting. It can be appreciated that the system can include any number of users and any number of devices.

Each user can be displayed in user interface as two-dimensional 2D images or each user can be displayed in a user interface as a three-dimensional representation, e.g., an avatar. The 3D representation may be a static model or a dynamic model that is animated in real-time responsive to a user input. Although this example illustrates a user interface with users displayed as 2D images, some of which can include live video renderings, it can be appreciated that the techniques disclosed herein can apply to other forms of representations, videos or other types of renderings. The computers 11 can be in the form of desktop computers, head-mounted display units, tablets, mobile phones, etc. The system can generate a user interface showing aspects of the communication session to each of the users. In the example of FIG. 1, a first user interface arrangement 101A can include a number of renderings 102 of one or more users 10.

The renderings 102 can include renderings of two-dimensional (2D) images, which can include a picture or live video feed of a user 10. The user interface arrangement 101A includes a plurality of renderings 102 each associated with individual users 10 of a communication session. Individual clusters, e.g., Cluster 1, of users represent individual discussion groups we're a subset of users are participating in a private session where each person shares bidirectional video and audio signals. This means that permissions for each user of a subgroup, such as Group 1 that is discussing AI and Education topics, can hear one another and see each other's video streams. They can also share content such as files and other information. The permissions restrict others from receiving the video streams or sending video streams to the subgroup. For example, the first cluster 1 of renderings represents a discussion 103A between a subset of users 10L-10O that are represented by individual renderings 102L-102O that are positioned in association with the cluster 1. This communication session also includes two other subgroups which involve a second discussion 103B and a third discussion 103C. The individual users having renderings 102 that are not part of a particular cluster have permissions that restrict them from receiving or sending audio or video streams to the subgroup members.

The user interface arrangement 101A can also include a list 104 of individual discussions 103 that are each associated with graphical elements outlining individual clusters 1-3 representing the individual discussions 103. Each discussion 103 on the list 104 can include a first button 107 that allows a user, which in this example is User A 10A, to receive audio streams from a corresponding subgroup participating in a discussion 103. A second button 108 allows a user, e.g., User A 10A, to send and receive audio and video streams with a corresponding subgroup participating in a discussion 103. Upon selection of the second button, the system changes permissions of the user to allow them to send and receive audio and video streams with a corresponding subgroup while also changing the location of representation of the user to move to the graphical element representing the subgroup.

Figure 2C:
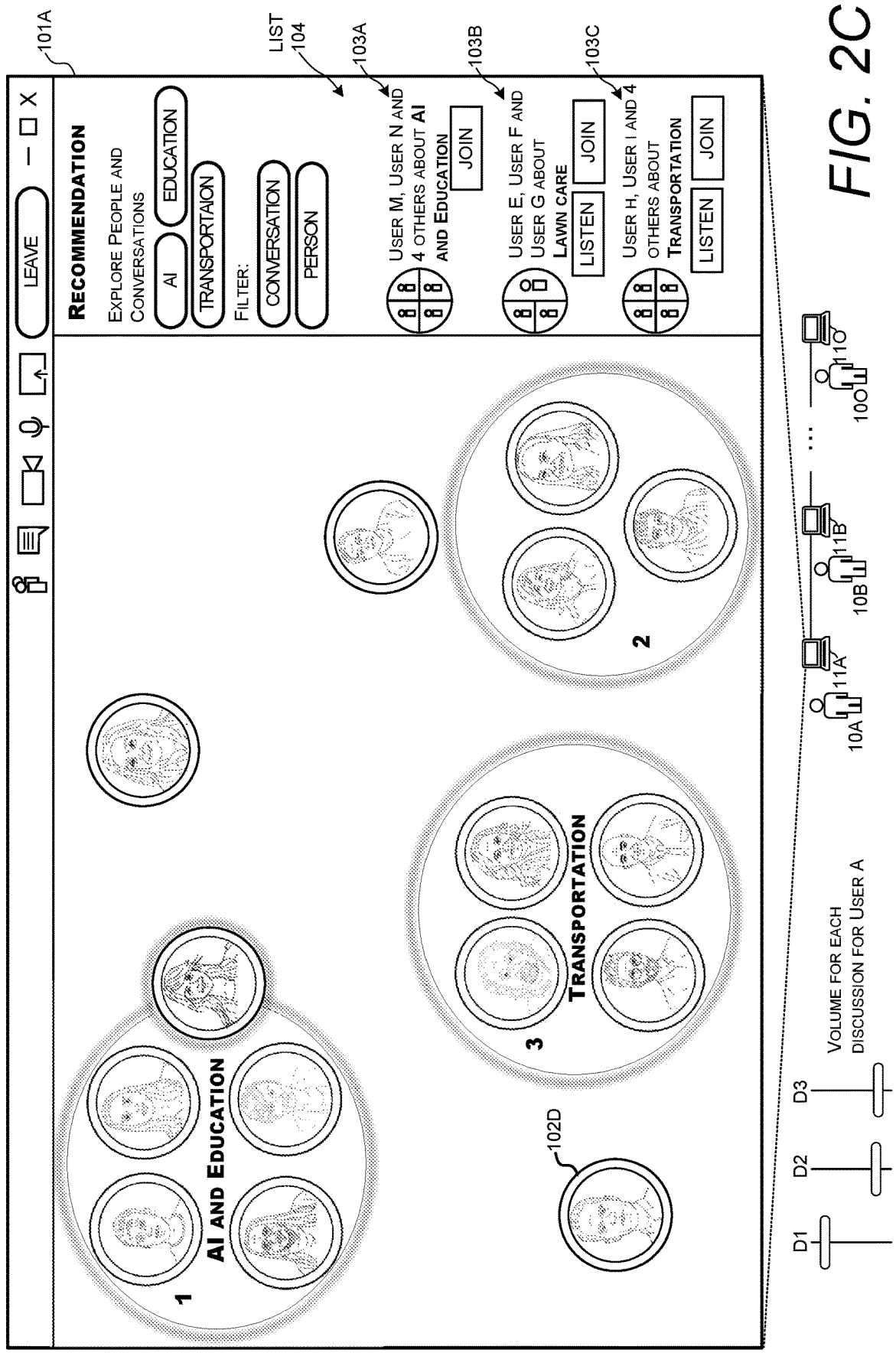
FIG. 2C shows a user interface in a third stage of a process for providing access control of audio and video streams and control of representations for communication sessions, wherein the user interface shows movement and a changed state of a representation and a changed state of access to an audio stream in response to an input command.

FIGS. 2A-2C show how a user, such as the first user 10A, can change their association with a group, e.g., the first group 103A, using a listen-only mode. For illustrative purposes, the user interface displayed in FIG. 2A is displayed to the first user 10A via an associated device 11A. To illustrate aspects of the present disclosure, visual indicators are provided in the lower left corner of the drawings to show the volume for each discussion for the first user 10A. In the operating state shown in FIG. 2A, in which User A has a rendering 102A that is not visually associated with a subgroup 103, the system restricts the device 11A of the first user 10A from communicating, receiving or sending, audio and video streams with other computers 11 of the other users 10.

The user can receive the audio streams of a discussion subgroup in a "listen-only mode" by selecting the "listen" button for a particular subgroup participating in a discussion. In this example, as shown in FIG. 2B, the first user 10A provides an input selecting the "listen" button 107 of the first discussion 103A, also referred to herein as a Discussion 1, first group 103A, or a representation of the first group 103A. A shown, the system 100 can receive an input indicating a selection of the first discussion 103A by an interaction with a graphical element 107 associated with the first discussion 103A, wherein the graphical element 107 is positioned in association with a description of the discussion 103A on the list 104.

As described herein, other types of inputs can be utilized to allow the user to listen to the audio streams of a particular discussion. For instance, the user can select a button related to a topic, such as the AI button on the top right corner of the user interface. If the AI button is selected, and given that the first discussion subgroup is discussing an AI topic, the system can bring highlight to the representation of the discussion 103A and allow that user to listen to the audio streams of that set of users 10L-10O participating in the subgroup. A person can also listen to that group discussion by using the filters that allow a search to be conducted by a person's name or keywords of the conversation. For example, if the first user selects the "Person" button and provides a name or identifier of a user in a subgroup, the system will allow the first user to listen or join that subgroup. These types of selections, in addition to the listen only access permission for the streams of the group, these selections also cause the user's rendering to be moved to, or within, the graphical representation of the group.

In response to the input, e.g., the command, indicating a selection of the first discussion 103A from the list 104, as shown in FIG. 2C, the rendering 102A of the first user 10A, who is associated with the input, is moved to the discussion cluster for the first discussion 103A. As shown, the system moves the rendering 102A representing the user 10A associated with the input to a position that indicates an association between the rendering 102A and the cluster 1 of renderings representing the selected discussion 103A. Thus, the discussion between a subset of users 10L-10O can now be heard in a "listen only" mode by the first user 10A. Thus, in response to the input, the system modifies access rights for the computing device 11A associated with the first user 10A to receive audio signals from computing devices 11L-11O of the subset of users 10L-10O having renderings 102L-102O positioned in association with the cluster 1.

Figure 2D:
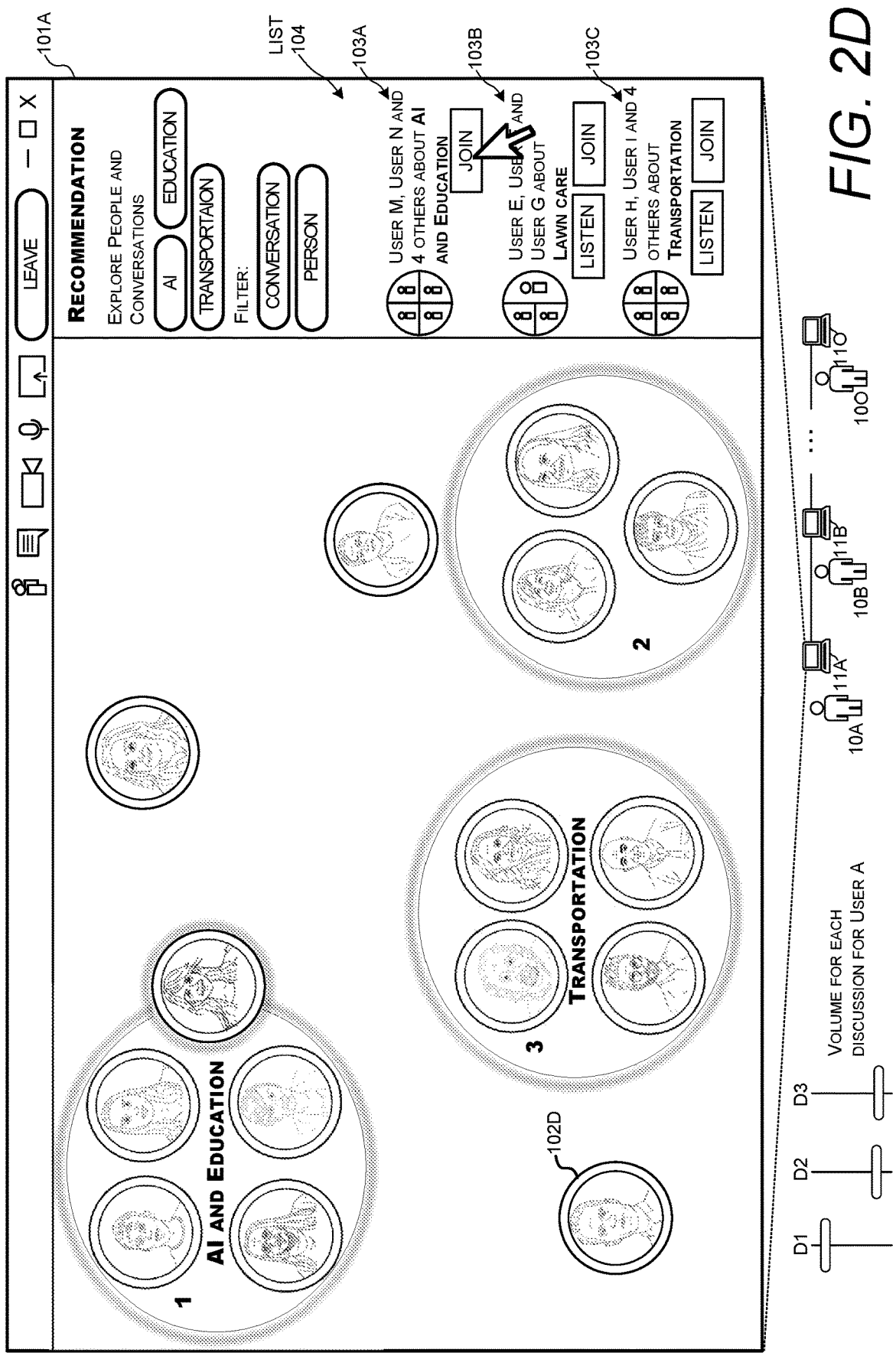
FIG. 2D shows a user interface in a fourth stage of a process for providing access control of audio and video streams and control of representations for communication sessions, wherein the user interface shows a second command for controlling video streams and additional access to video streams in response to the second command.

FIGS. 2D-2E show how a person can join a group using a Full Join that provides bidirectional audio and/or bidirectional video exchange between members of a selected subgroup and a requesting user. As shown in FIG. 2D, a user, such as the first user 10A can provide an input selecting a discussion. For instance, the system can receive a selection of a second graphical element 108, e.g., the Join button, that is associated with the first discussion 103A. The second graphical element 108, the Join button, is positioned in association with a description of the first discussion 103A on the list 104. The description includes names of people of the subgroup of the first discussion and/or a topic.

In response to the selection of the second graphical element 108 of the discussion 103A from the list 104 or other forms of input indicating a join, the system can cause a transition from the user interface arrangement 101A comprising the plurality of renderings 102 of FIG. 2A to a second user interface arrangement 101B of FIG. 2E comprising individual renderings 102L-102O of the subset of users 10L-10O with the graphical elements outlining the cluster 1 and graphical elements representing other clusters. Also in response to the selection of the second graphical element 108 of the discussion 103A from the list 104 or other forms of input indicating a join, the system can modify the access rights for the computing device 11A associated with the first user 10A to allow the computing device 11A to send audio signals to the computing devices 11L-11O of the subset of users 10L-10O having renderings 102L-102O positioned in association with the cluster 1. In some embodiments, in response to the selection of the second graphical element 108 of the discussion 103A from the list 104 or other forms of input indicating a join, the system can modify the access rights for the computing device 11A to allow bidirectional video and audio communication with the computing devices 11L-11O of the subset of users 10L-10O having renderings 102L-102O positioned in association with the cluster 1 of the first discussion 103A.

Figure 3A:
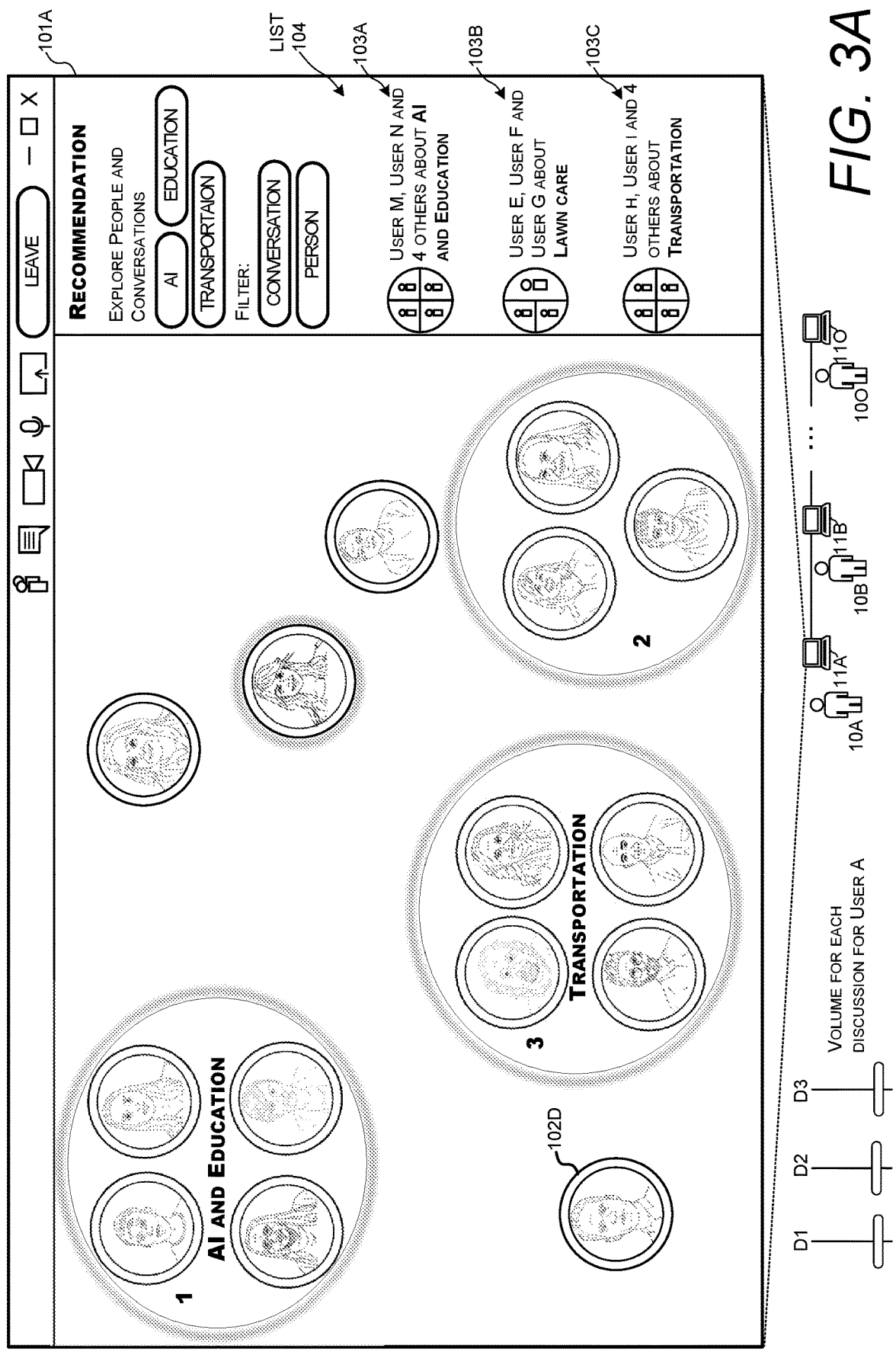
FIG. 3A shows a user interface in a first stage of a process for providing access control of audio and video streams in response to movement of representations for communication sessions.

FIGS. 3A-3M a process for providing access control of audio and video streams in response to movement of representations for communication sessions. FIG. 3A shows a user interface in a first stage of a process for providing access control of audio and video streams in response to movement of representations for communication sessions. The rendering of the first user (as shown in FIG. 1 as rendering 102A for User 10A) is not associated with any particular discussion 103 subgroup. Thus, the computer of the first user is restricted from exchanging audio and video signals with devices of other users.

Figure 3B:
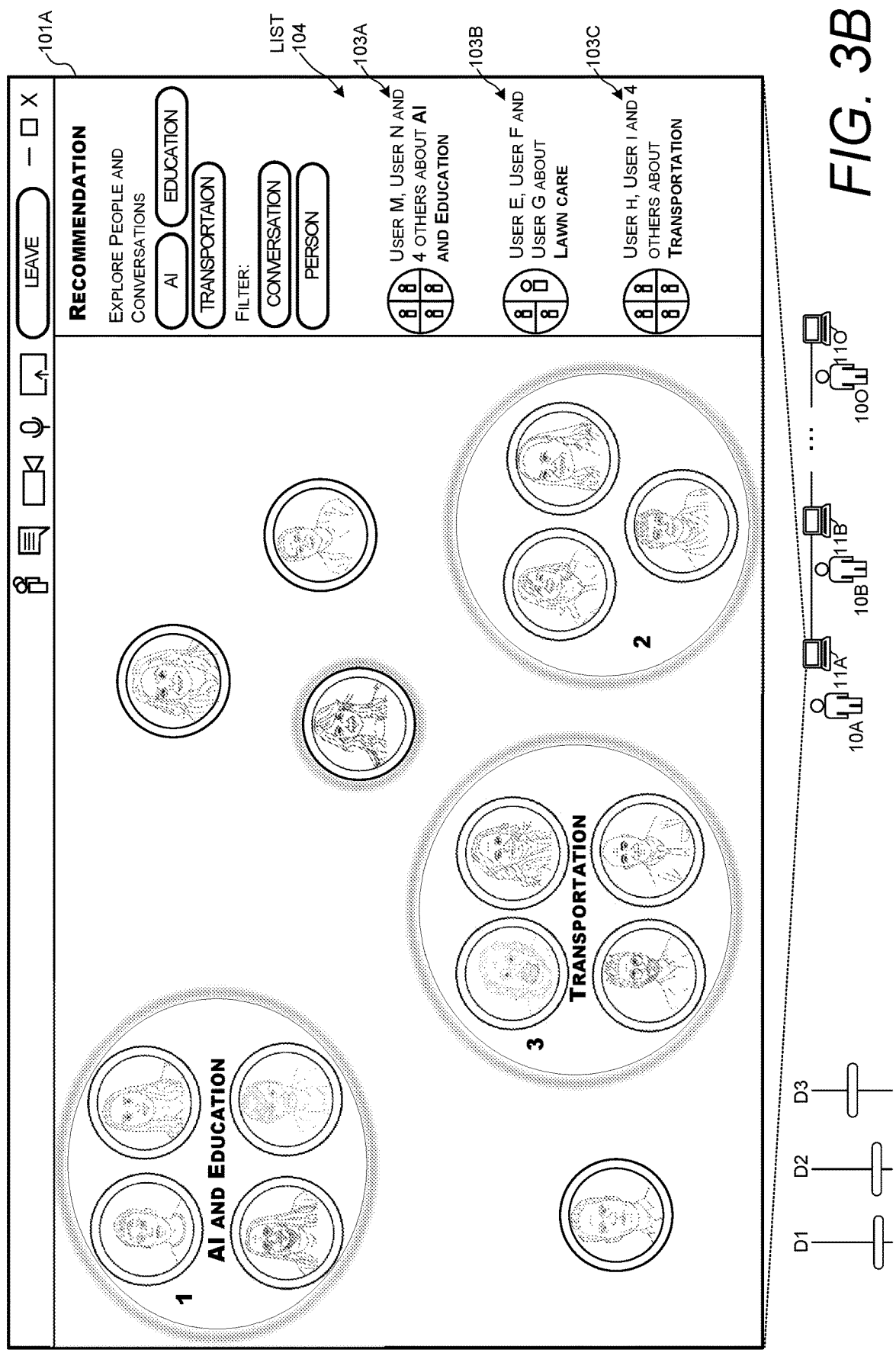
FIG. 3B shows a user interface in a second stage of a process for providing access control of audio and video streams in response to movement of representations for communication sessions, where one representation of a person is moving towards a representation of a discussion.
Figure 3C:
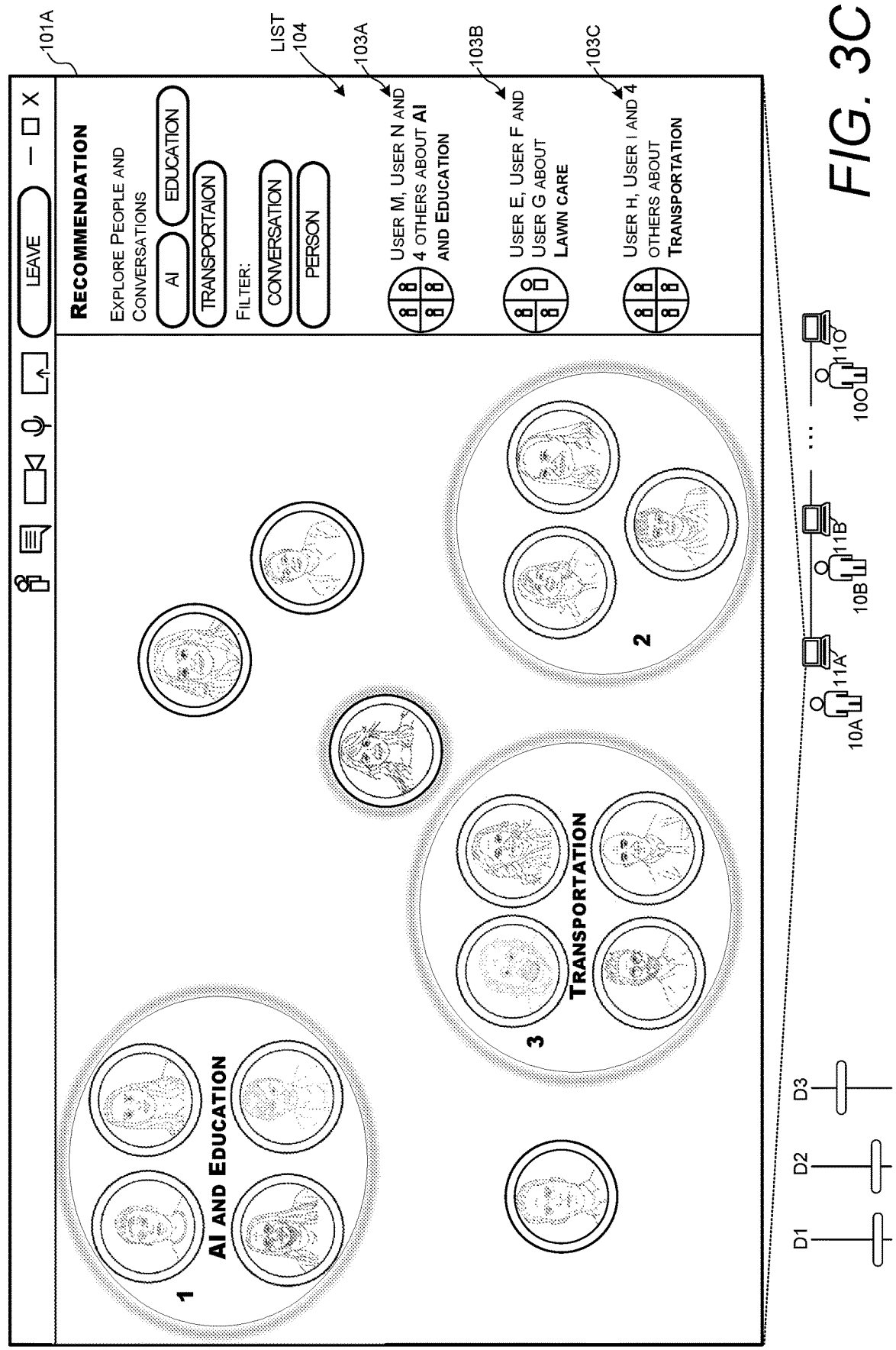
FIG. 3C shows a user interface in a second stage of a process for providing access control of audio and video streams in response to movement of representations for communication sessions, where one representation of a person is moving towards a representation of a discussion.
Figure 3D:
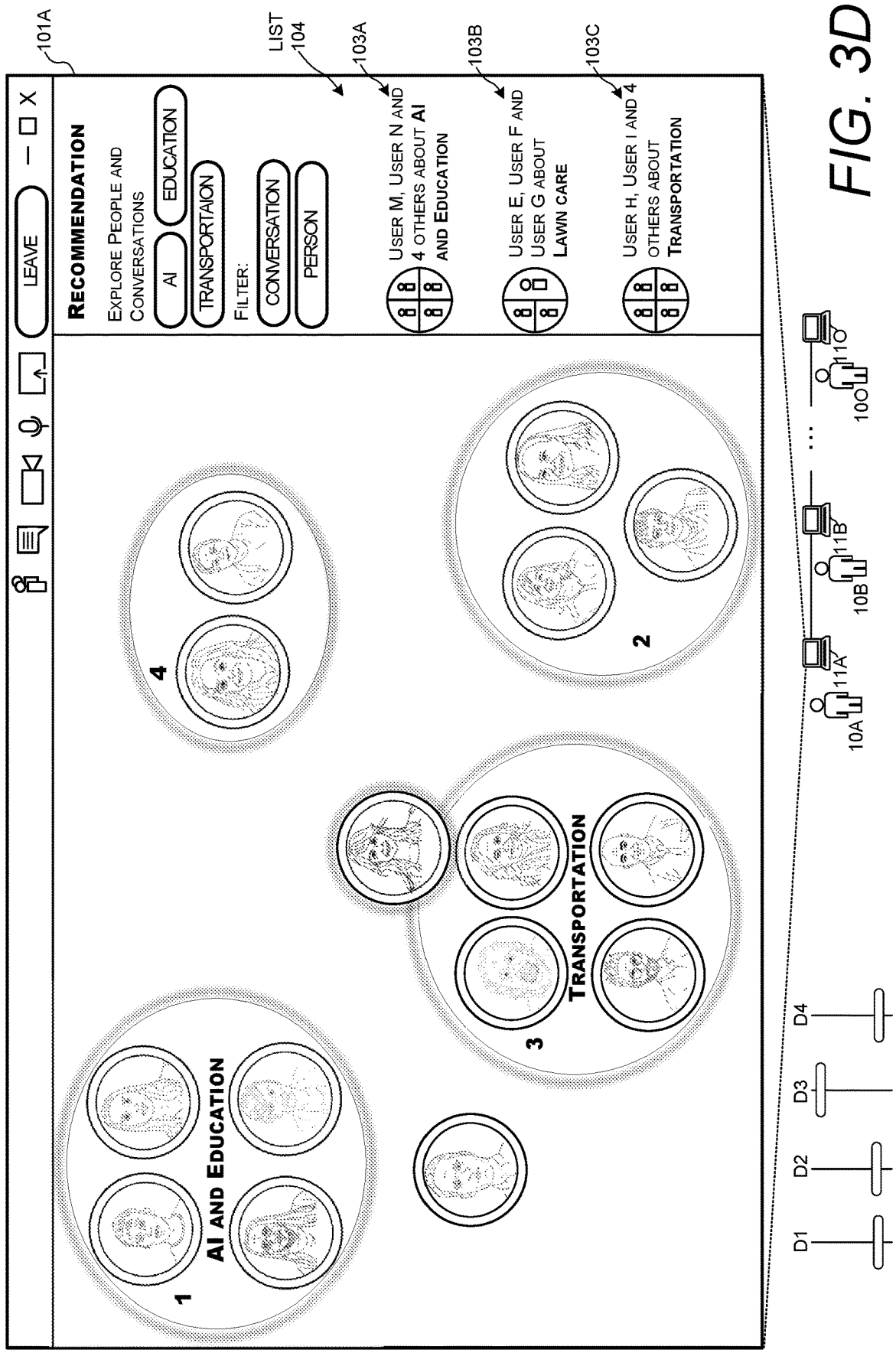
FIG. 3D shows a user interface in a second stage of a process for providing access control of audio and video streams in response to movement of representations for communication sessions, where one representation of a person is moving towards a representation of a discussion.

FIG. 3B-3D shows the rendering of the first user moving to a position such that the rendering of the first user has a graphical association with the third group. The movement of each user can be based on voice commands, pointer input commands, or any other suitable input from each user. The response to this graphical relationship, the permissions of the first computer are modified to allow the First computer of the first user to receive audio streams from computers of users that have a representation depicted in association, within the boundaries of, the third subgroup 3. At the same time, User B and User C have moved within a predetermined distance of one another. When two people move within a predetermined distance of one another, the system changes their permissions so they can engage in a conversation with a bidirectional audio exchange, e.g., a voice call. This activity forms a fourth discussion with a new subgroup. They can escalate to a video call by approval of both parties.

Figure 3E:
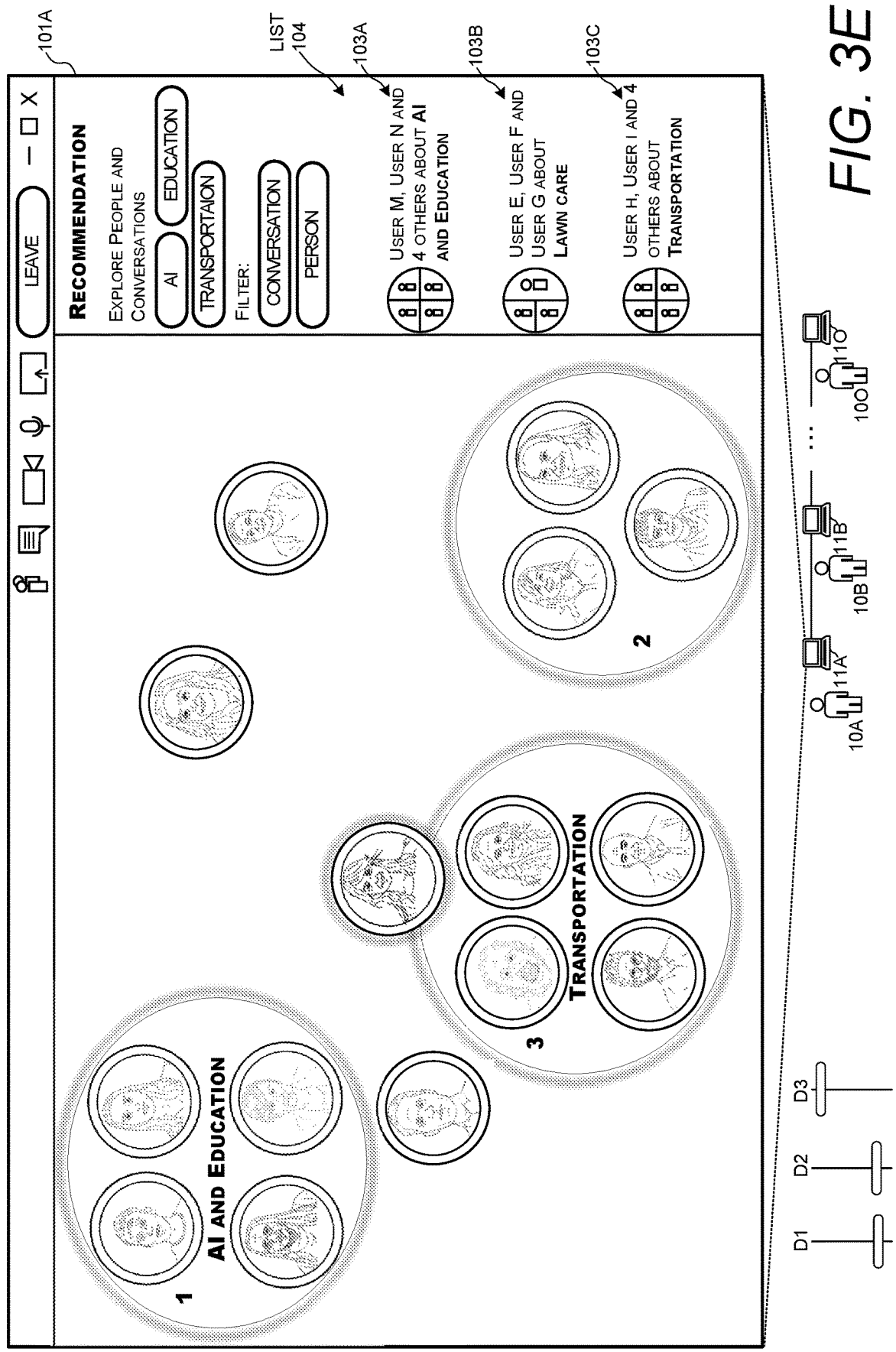
FIG. 3E shows a user interface in a second stage of a process for providing access control of audio and video streams in response to movement of representations for communication sessions, where one representation of a person is moving towards a representation of a discussion.

FIG. 3E shows a scenario where User B and User C have moved their representations away from one another. When the distance between these representations exceeds a threshold, the system restricts their devices from being able to exchange audio or video strange. Any data defining a group object for the fourth discussion 4 is also removed or deactivated. Also shown in FIG. 3D, User A has moved but is still in listen only for the third discussion 3 since their representation still shows a graphical association with the group, e.g., touching a boundary, within a boundary, having a threshold distance from a point within the a graphical item (e.g., the circle) representing the group, etc.

Figure 3F:
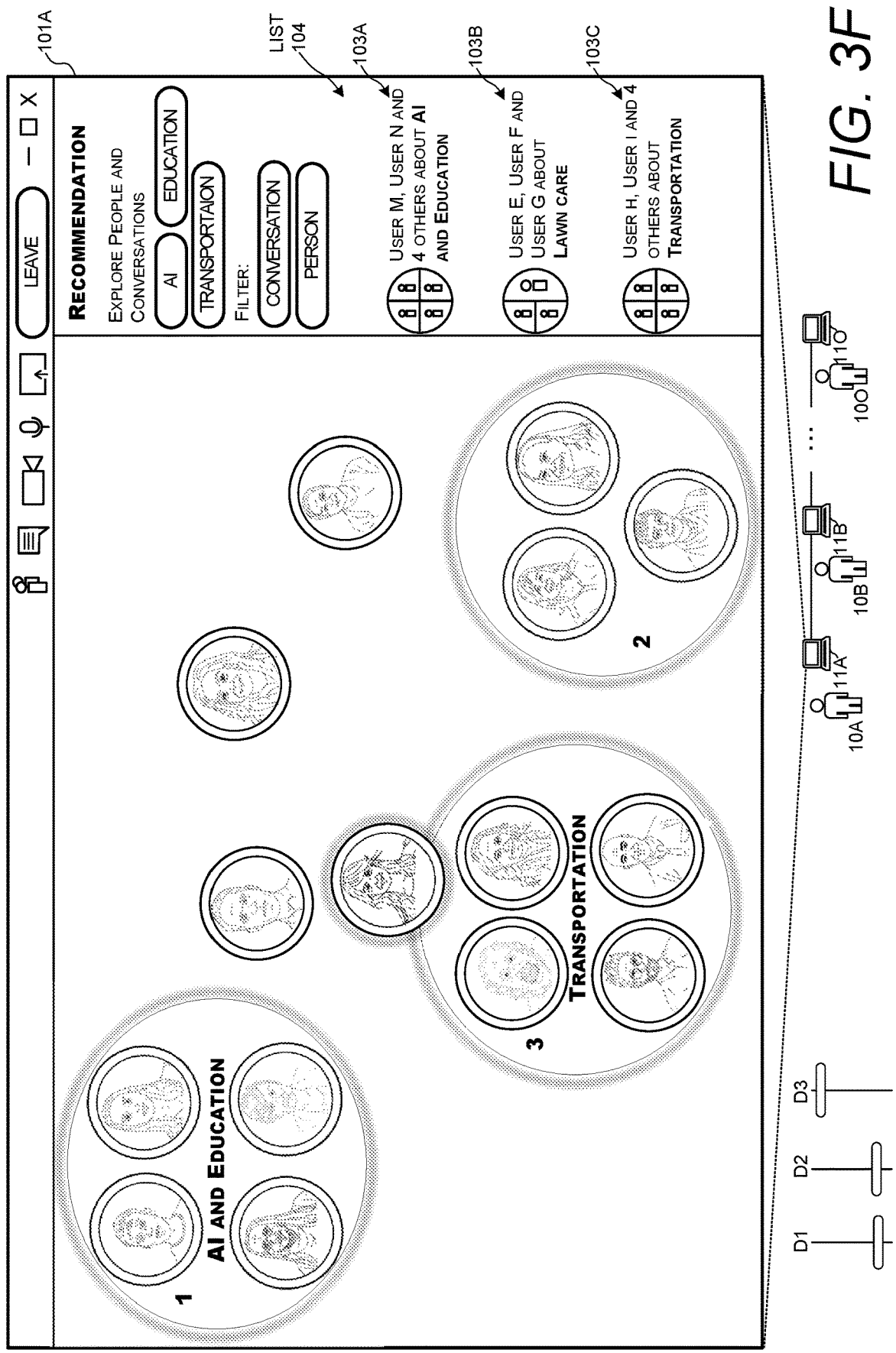
FIG. 3F shows a user interface in a second stage of a process for providing access control of audio and video streams in response to movement of representations for communication sessions, where one representation of a person is moving towards a representation of a discussion.
Figure 3G:
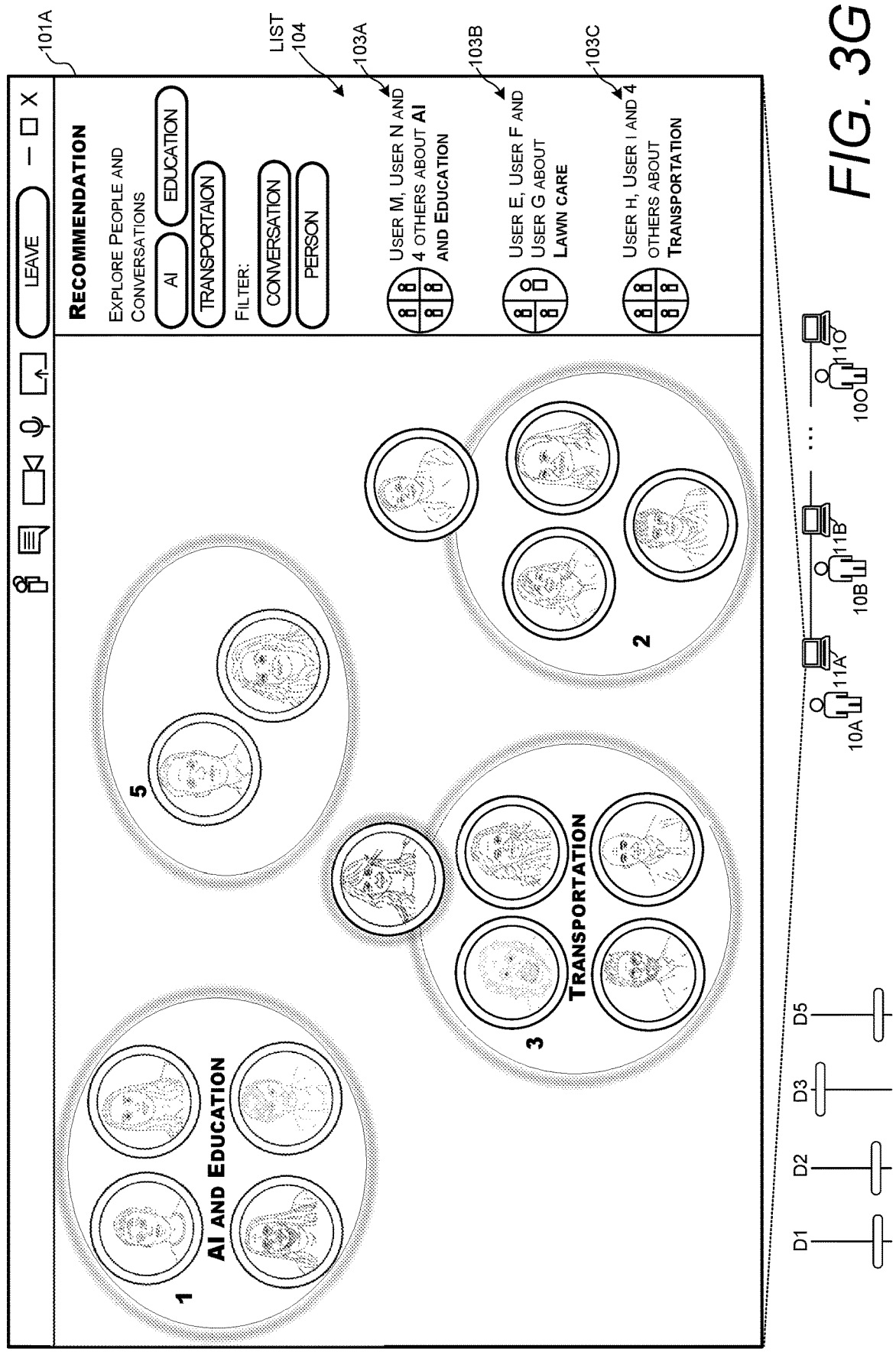
FIG. 3G shows a user interface in a second stage of a process for providing access control of audio and video streams in response to movement of representations for communication sessions, where one representation of a person is moving towards a representation of a discussion.

FIGS. 3F and 3G shows that User B and User D (shown in FIG. 1) have moved within a threshold distance of one another to create a new discussion group, a fifth discussion 5. This allows User B and User D to exchange audio and video signals. Once a group is formed, a user can move to a boundary of the group to do a listen only. But can only do a full join after a second command is received. Also shown, User C has also moved to a position that shows a graphical association with the second group. This allows User C to listen to the audio streams of the people associated with the second discussion group.

Figure 3I:
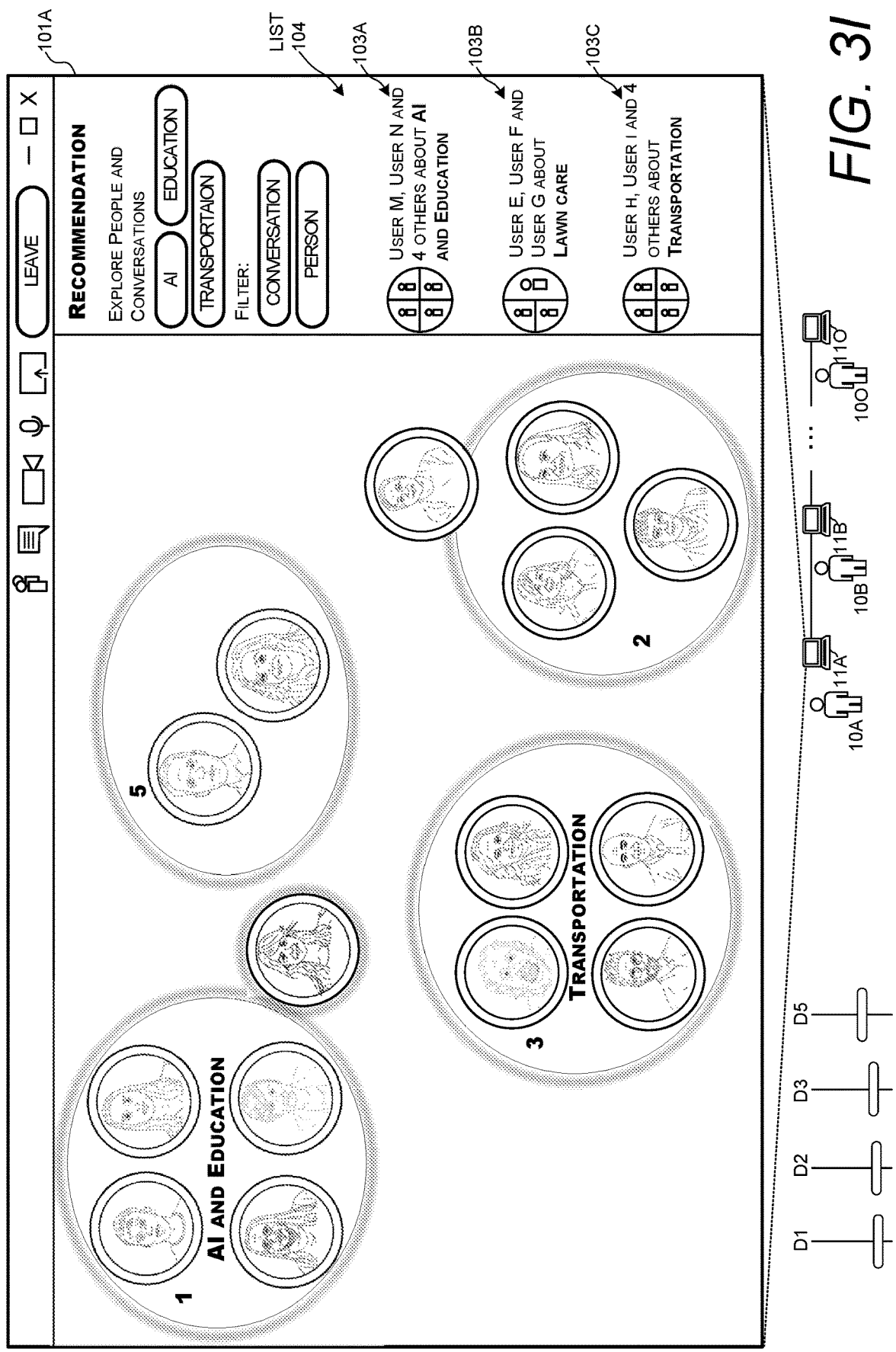
FIG. 3I shows a user interface in a second stage of a process for providing access control of audio and video streams in response to movement of representations for communication sessions, where one representation of a person is moving towards a representation of a discussion.
Figure 3J:
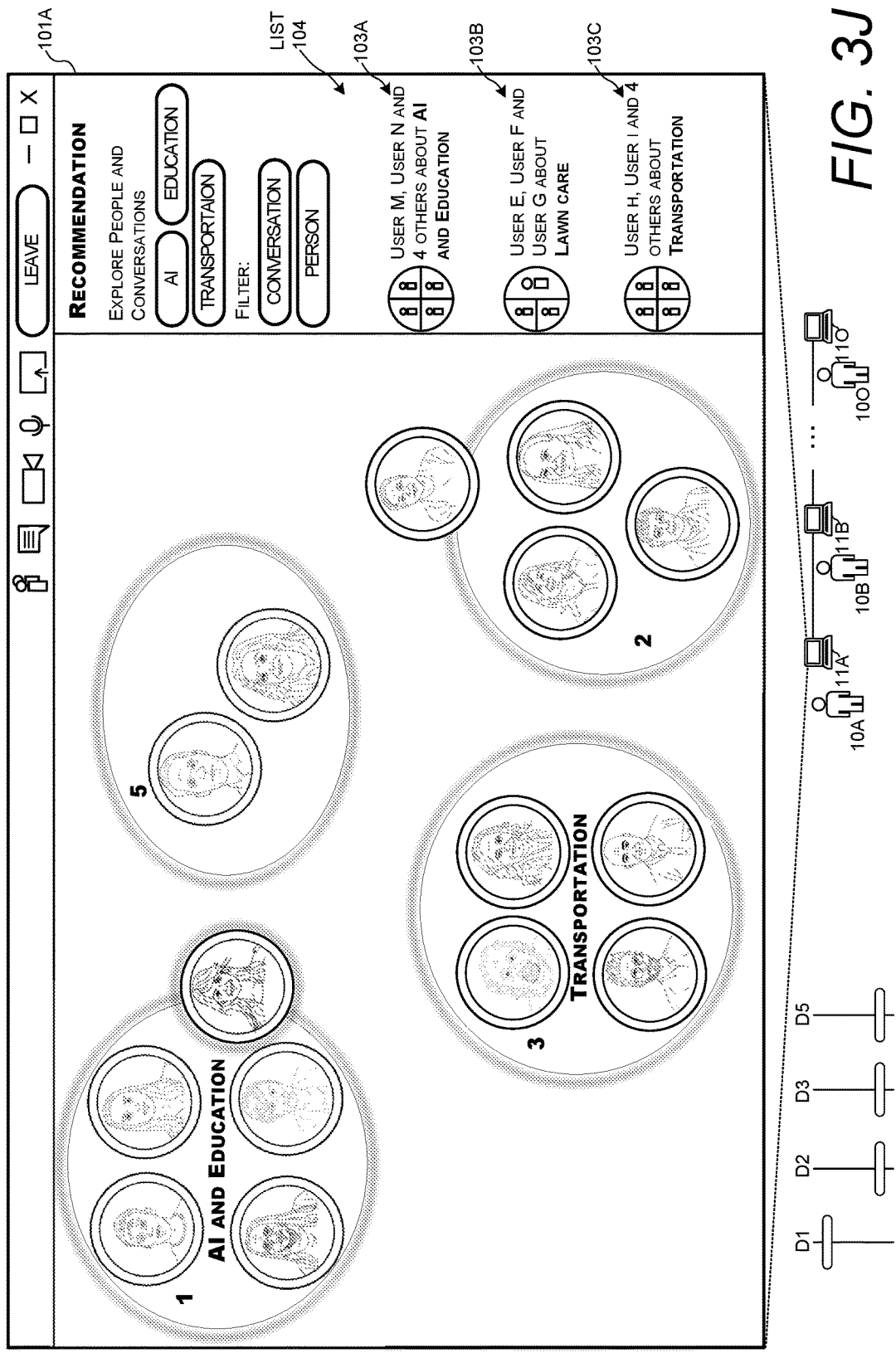
FIG. 3J shows a user interface in a second stage of a process for providing access control of audio and video streams in response to movement of representations for communication sessions, where one representation of a person is moving towards a representation of a discussion.
Figure 3K:
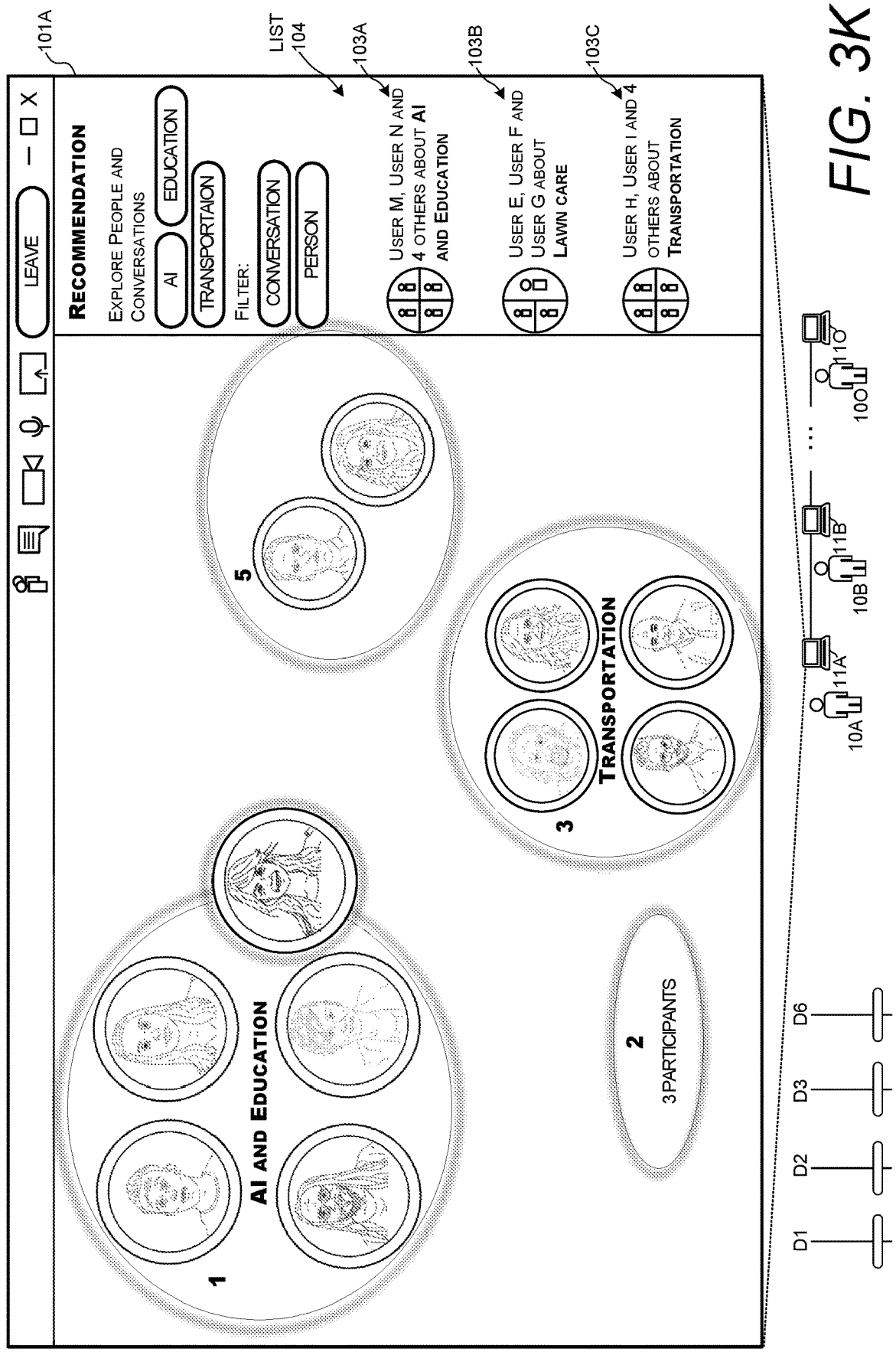
FIG. 3K shows a user interface in a second stage of a process for providing access control of audio and video streams in response to movement of representations for communication sessions, where one representation of a person is moving towards a representation of a discussion.
Figure 3L:
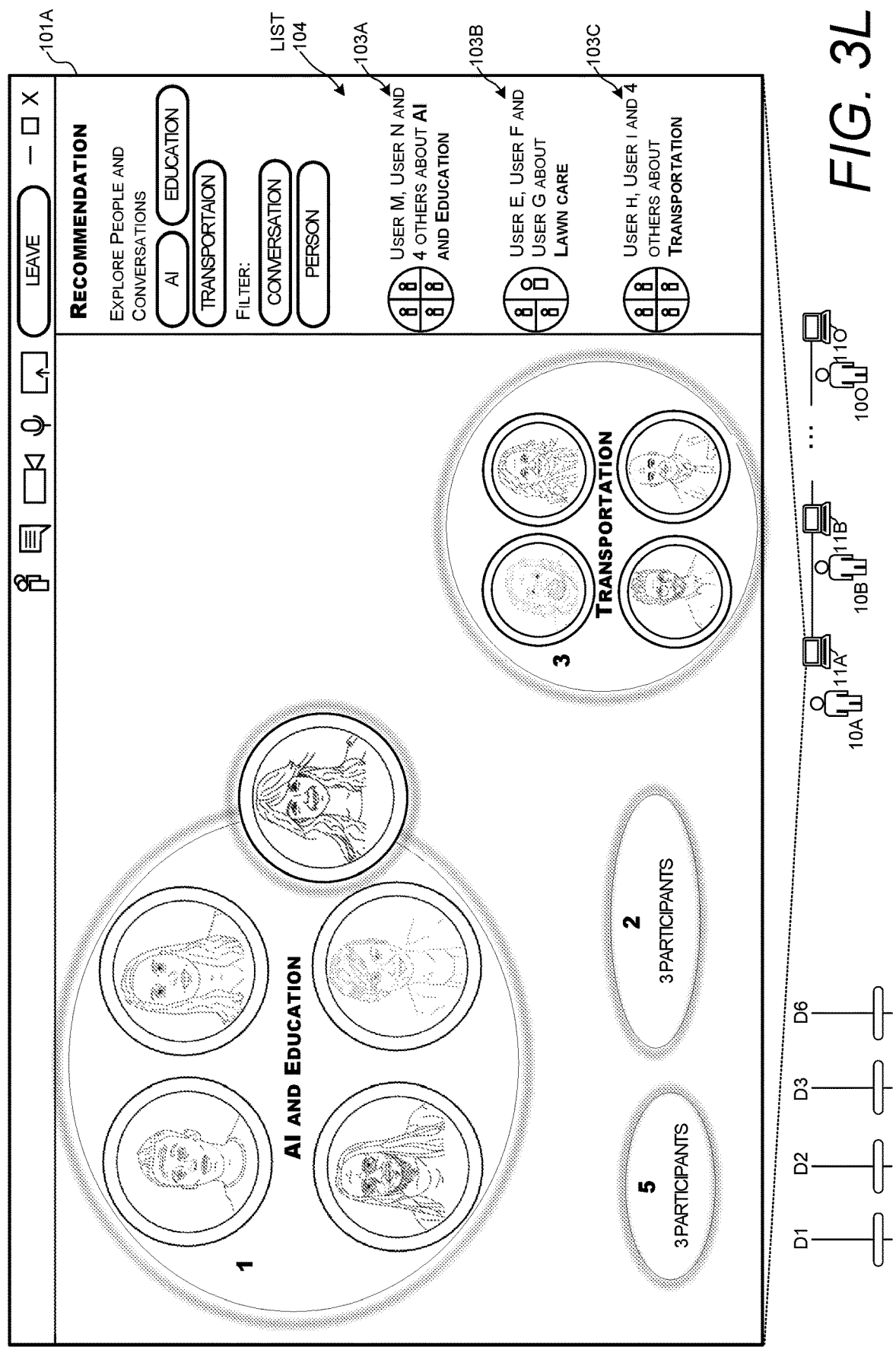
FIG. 3L shows a user interface in a second stage of a process for providing access control of audio and video streams in response to movement of representations for communication sessions, where one representation of a person is moving towards a representation of a discussion.
Figure 3M:
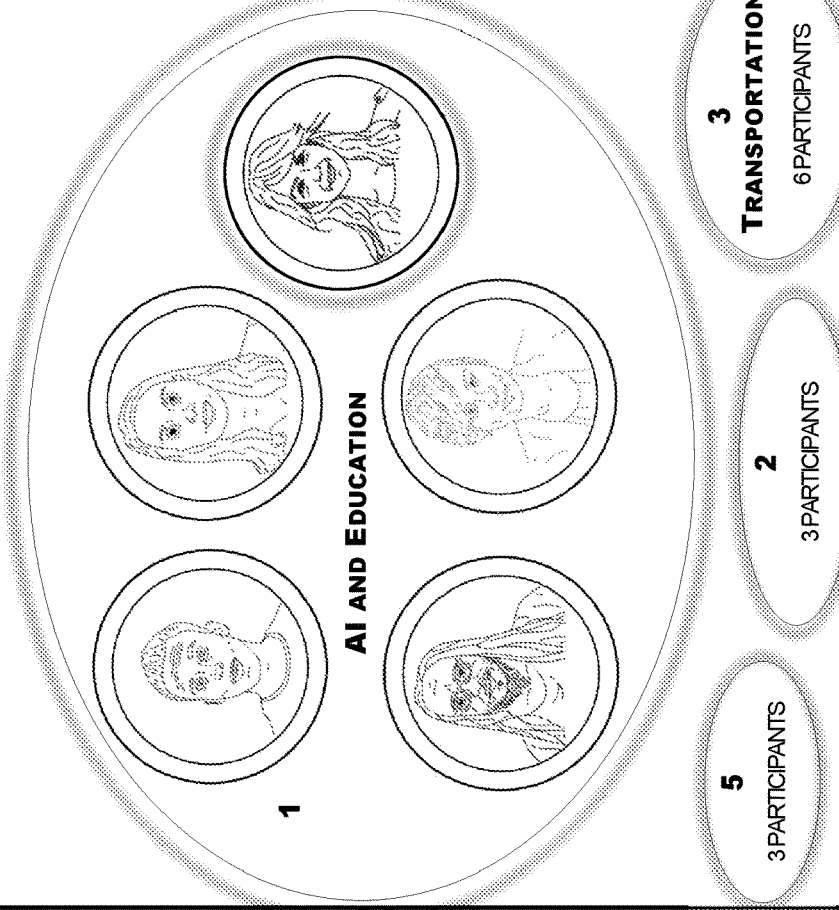
FIG. 3M shows a user interface in a second stage of a process for providing access control of audio and video streams in response to movement of representations for communication sessions, where one representation of a person is moving towards a representation of a discussion.
Figure 3M:
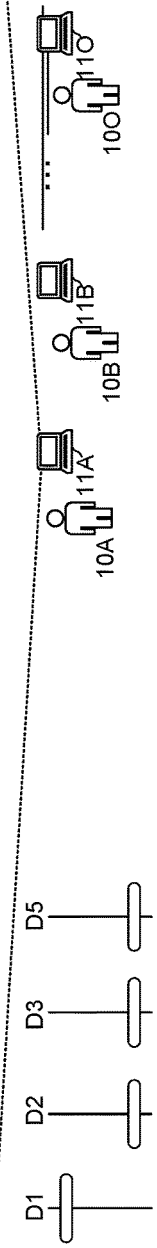

A shown in FIG. 3H, User A has moved their representation to a position such that their representation has a graphical association with the fifth discussion group. This allows User A to listen to the discussion between User B and User D. Then as shown in FIGS. 3I to 3J, User A moves their representation to a position such that their representation has a graphical association with the first discussion group. This allows User A to listen to the discussion between the users of that group (User 10L-10O).

The transitions of the user interface shown in FIG. 3J to FIG. 3M show how User A can transition to a full Join of the first group. This transition can be in response to a command or an input that indicates User A desires to fully participate in a discussion having bidirectional audio and video communication. As shown throughout the transition, the user interface can bring focus to a particular discussion group, such as the first discussion group, by zooming into that group and showing the representation (the oval around the renderings) of the group along with live video streams of each user on the right side of the user interface. The second user interface arrangement 101B of FIG. 3M can have a self-view on the lower right part of the UI and the left section can show a representation of the group, along with live video streams, shown on the right side of the UI. Other smaller representations of other groups can also be displayed, e.g., with group identifiers or topic titles.

In some configurations, when a user is not participating in a subgroup discussion, e.g., a breakout session or a private communication session with a subgroup of users, the user can receive audio signals from multiple subgroups so they can hear different conversations to help them make a choice of which group to join. In some configurations, the audio streams from different conversations can be based on spatial audio techniques to make a sound appear that is coming from a particular direction.

FIG. 4A shows aspects of a first output of controlled spatial audio signals based on a first set of locations of representations on a user interface. In this example, User A has a representation positioned between two clusters each representing different subgroup conversations. Given that the first discussion group 1 is positioned on the left of User A's representation, the system may play the audio streams from that first discussion 1 in the left speaker of speaker of User A's computing device. Similarly, given that the second discussion group 2 is positioned on the right of User A's representation, the system may play the audio streams from that second discussion 2 in the right speaker of User A's computing device.

Figure 4B:
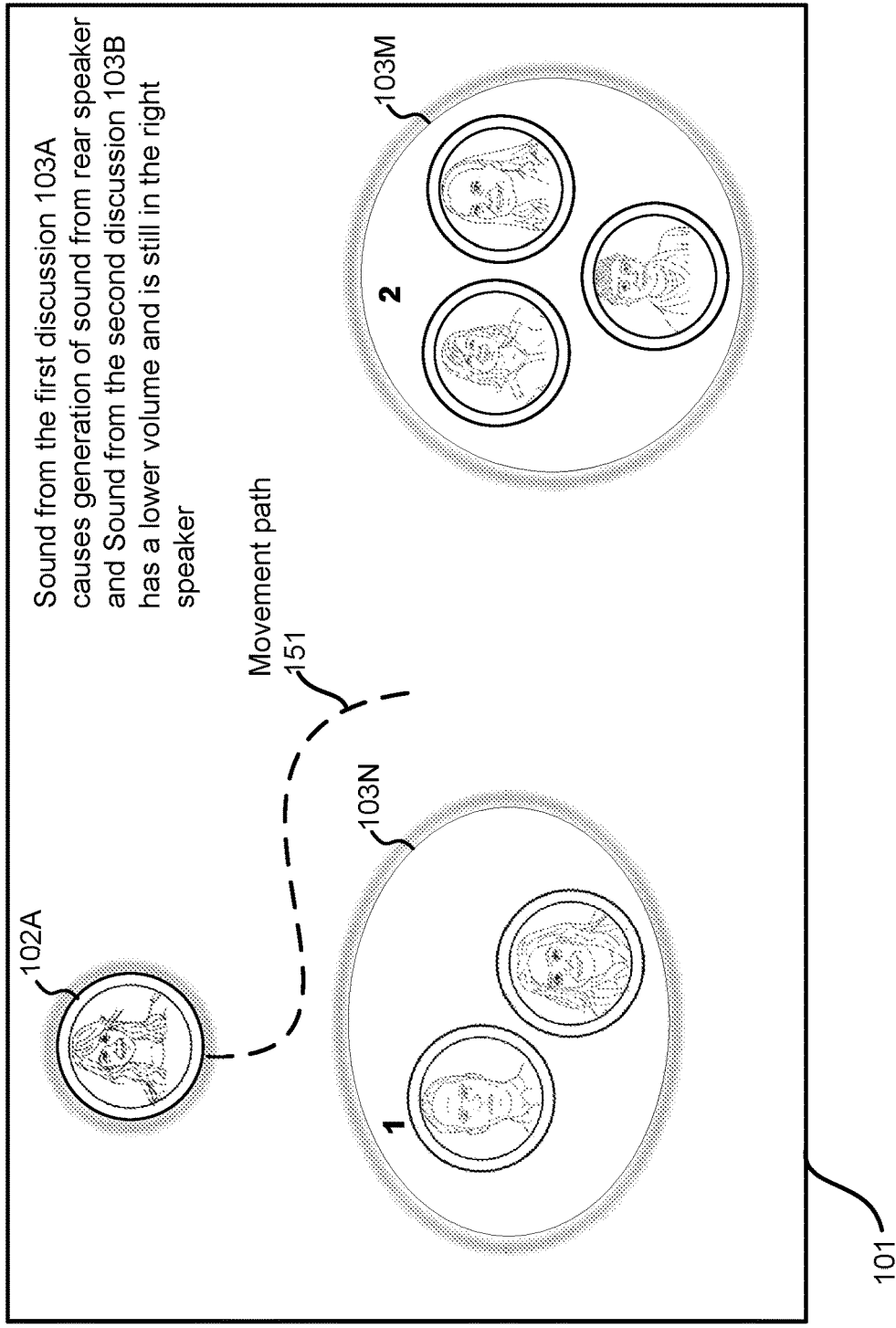
FIG. 4B shows aspects of a second output of other controlled spatial audio signals based on a second set of locations of representations on a user interface.

FIG. 4B shows aspects of a second output of other controlled spatial audio signals based on a second set of locations of representations on a user interface. With User A's representation now moved to a new position, as shown by the path 151, the system modifies the source of the streams. In this new position, the system may lower the volume of the audio streams from the second discussion 2, and the system may play the audio streams from that first discussion 1 in a rear speaker of speaker of User A's computing device.

In such configurations, a system may cause the communication of audio signals from computing devices 11P-11T of users 10P-10T participating in other discussion subgroups to the computing device 11A associated with the user 10A. The audio signals from computing devices 11P-11T are communicated to the computing device 11A associated with the user 10A while a position of the rendering 102A of the user 10A does not have a visual association with the cluster 1, e.g., a user is not part of a subgroup. A first component of the audio signals, e.g., a left channel of a stereo signal, can include audio signals from a first cluster of users 10P-10Q participating in a first discussion 103N. A second component of the audio signals, e.g., a right channel of a stereo signal, can include audio signals from a second cluster of users 10R-10T participating in a second discussion 103M. A volume of the first component is based on a distance between the rendering 102A of the user 10A and a representation of the first cluster. A volume of the second component is based on a distance between the rendering 102A of the user 10A and a representation of the second cluster.

Figure 5:
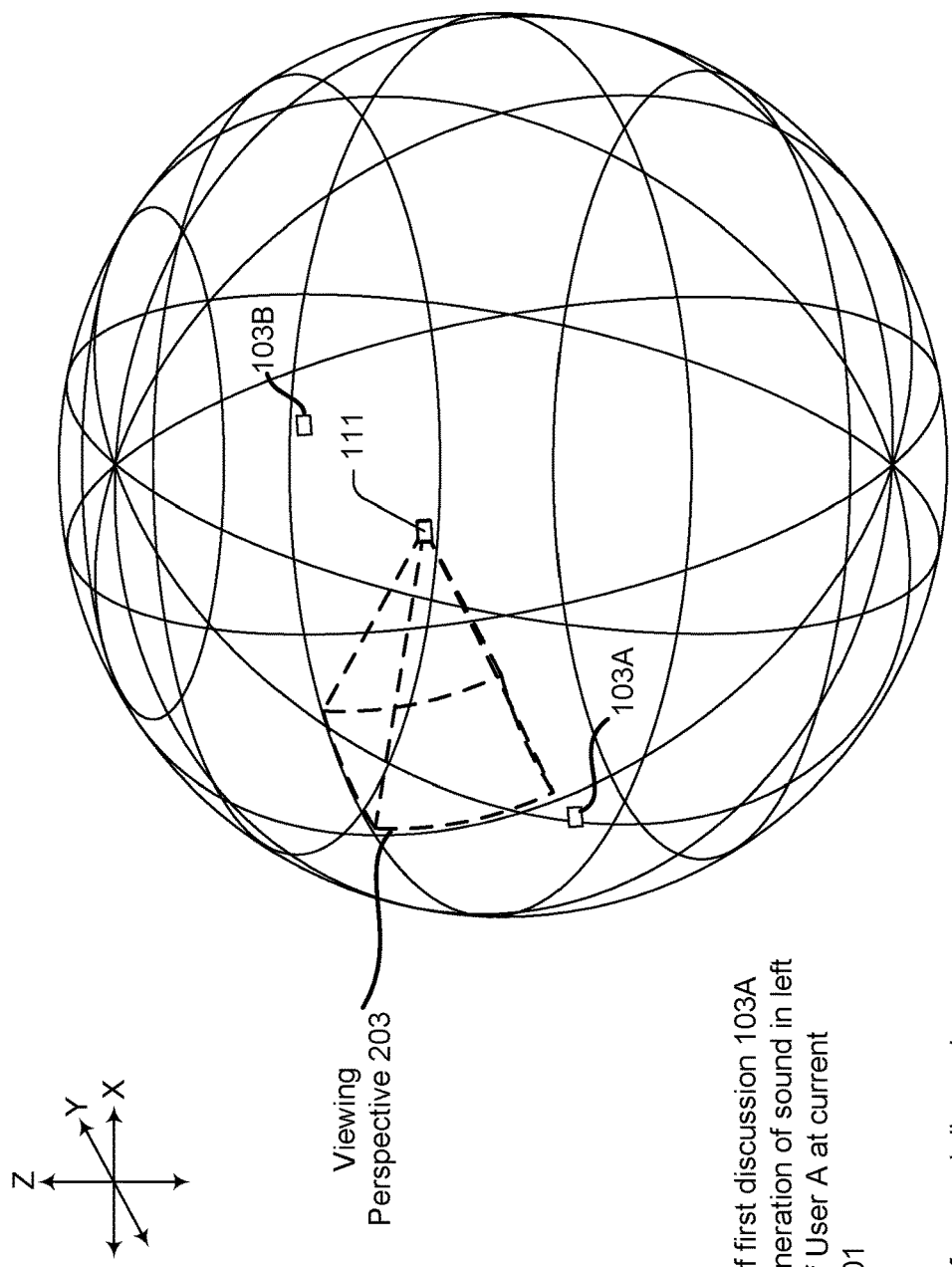
FIG. 5 shows aspects of an output of controlled spatial audio signals based on a set of locations of representations in a 3D environment.

FIG. 5 shows aspects of an output of controlled spatial audio signals based on a set of locations of representations in a 3D environment. In such embodiments, the location of a source of the first component is based on a location of the rendering 102A of the user 10A relative to a location of the representation of the first cluster. A location of a source of the second component is based on the location of the rendering 102A of the user 10A relative to a location of the representation of the second cluster.

In the embodiment of FIG. 5, spatial audio signals can be generated by HRTF or Dolby Atmos technologies. This allows speakers to generate sounds that appear to come from a particular location in the real world relative to a user. Thus, if a computing device is to generate a sound for a user that appears to be coming from the left side of the user, the system can generate those signals. In this case, if a position of an avatar 111 is in the center of a sphere and the avatar is facing in a particular direction, the system can generate a signal component that gives the user the experience that the sound is coming from their left side when a discussion subgroup 103A has a representation that is positioned on the left side of the avatar. Similarly, if a position of an avatar 111 is in the center of a sphere and the avatar is facing in a particular direction, the system can generate a second signal component that gives the user the experience that the sound is coming from their right side when a discussion subgroup 103B has a representation that is positioned on the right side of the avatar.

Figure 6:
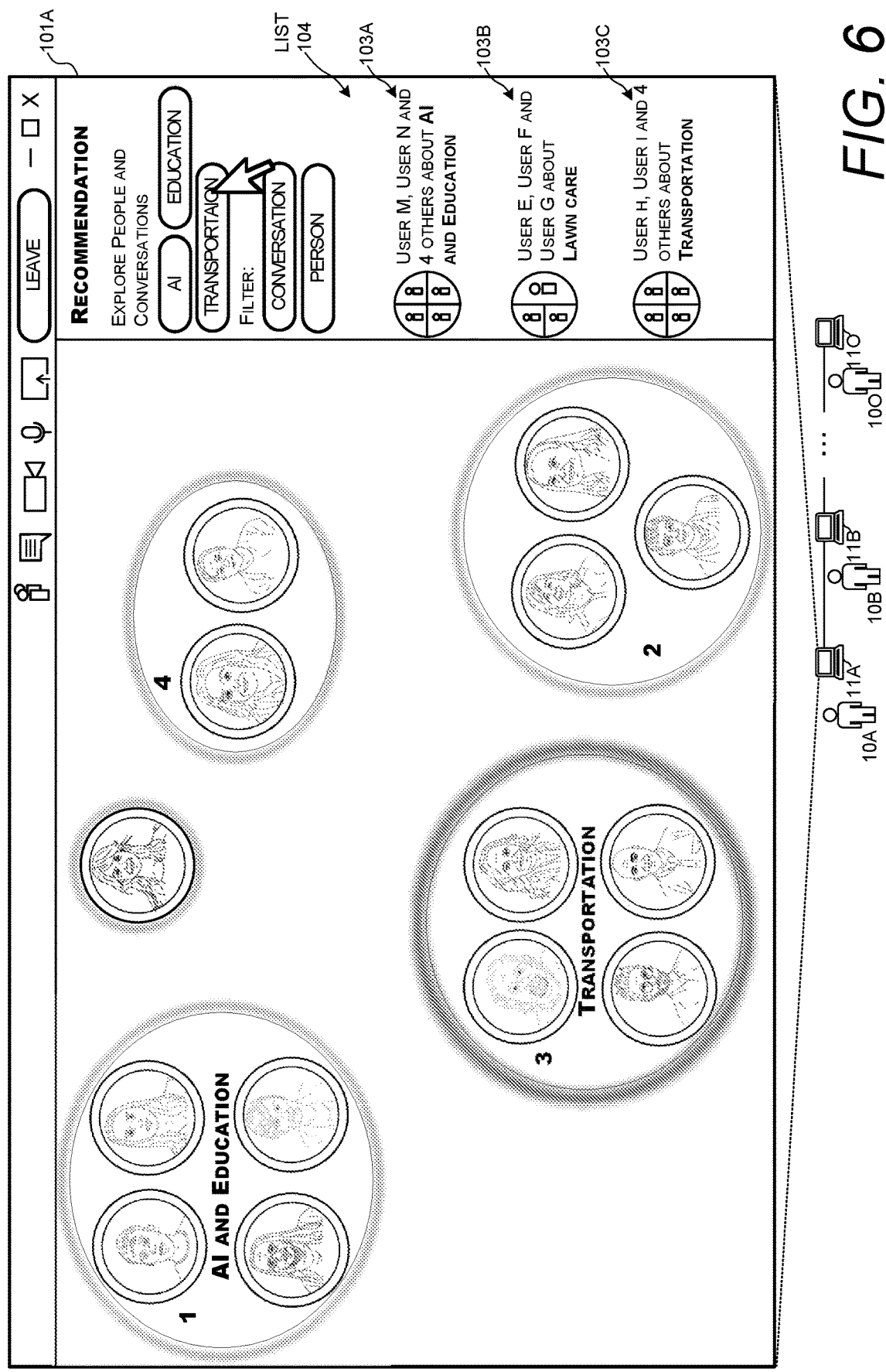
FIG. 6 shows aspects of an embodiment where subgroups can be identified and selected based on the selection of topics of related discussions or people engaging in the related discussions.

FIG. 6 shows aspects of an embodiment where subgroups can be identified and selected based on the selection of topics of related discussions or people engaging in the related discussions. As shown in FIG. 6, other types of inputs can be utilized to allow the user to listen to the audio streams of a particular discussion period for instance come up the user can select the AI button on the top right corner of the user interface. Given that the first discussion subgroup is discussing an AI topic, the system can bring highlight to the representation of the discussion 103A and allow that user to listen to the audio streams of that set of users 10L-10O participating in the subgroup. A person can also listen to that group discussion by using the filters that allow a search to be conducted by a person's name or keywords of the conversation. For example, if the first user selects the "Person" button and provides a name or identifier of a user in a subgroup, the system will allow the first user to listen or join that subgroup.

In the embodiments related to FIG. 6, the input indicating the selection of the discussion 103A can include operations for receiving an input indicating a topic. The system can then determine that the topic is related to the discussion. If the topic is related to the discussion, the system can move the rendering 102A representing the user 10A to the group and modify access rights for the computing device 11A associated with the user 10A to receive audio signals from people in that subgroup, in response to determining that the topic is related to the discussion.

The input indicating the selection of the discussion 103A can include receiving an input indicating an identifier of a discussion participant. The system can then determine that the discussion participant identified in the input is participating in the discussion with a subgroup of users 10L-10O. The system can then move the rendering 102A representing the user 10A to that subgroup and modify access rights for the computing device 11A associated with the user 10A to receive audio signals from the subgroup in response to determining that the discussion participant identified in the input is participating in the discussion with a subgroup of users.

Figure 7:
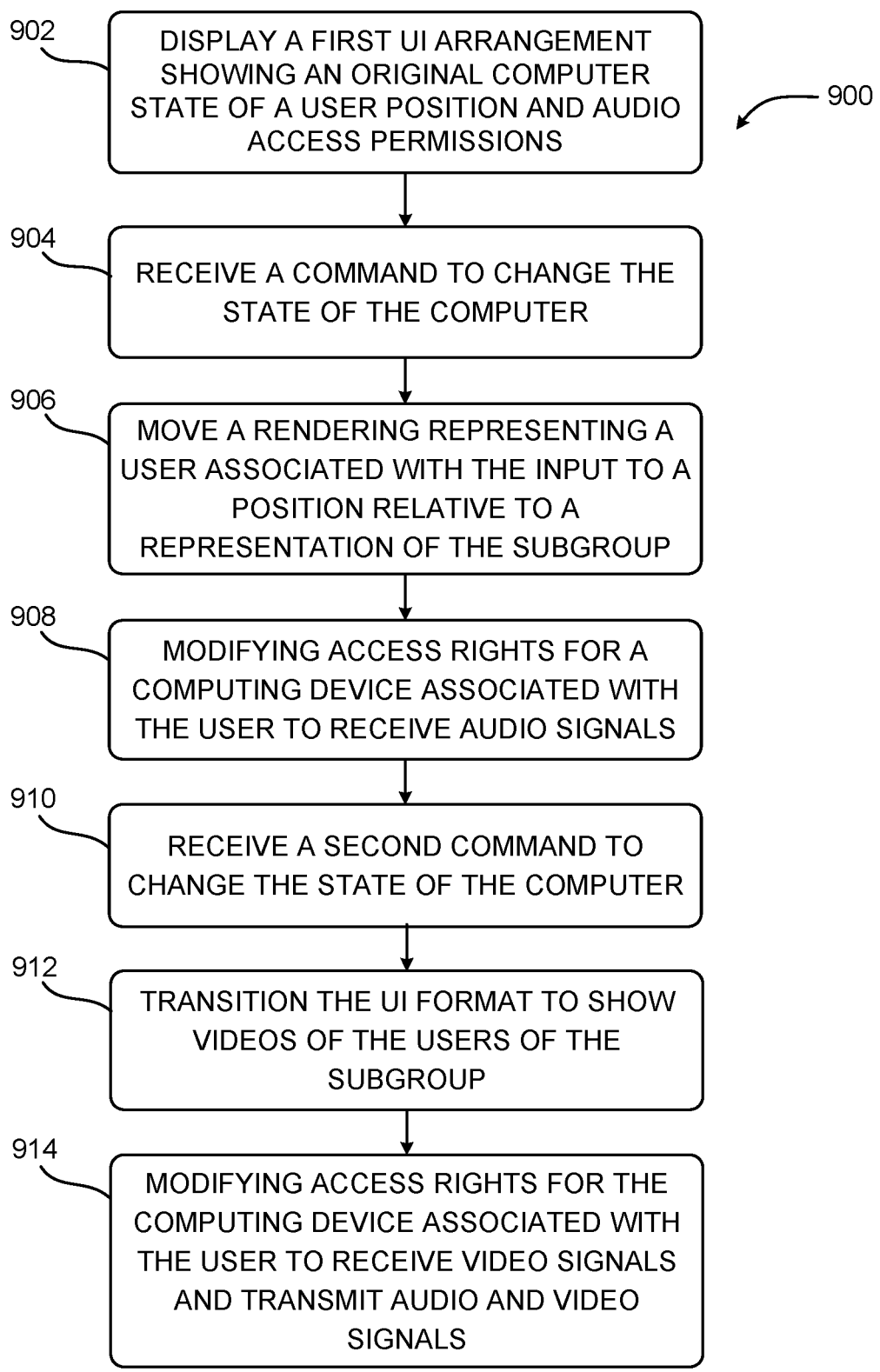
FIG. 7 is a flow diagram showing aspects of a routine for the disclosed techniques.

FIG. 7 is a diagram illustrating aspects of a routine 900 for computationally efficient management of access permissions and user interface arrangements. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 7 and the other FIGURES can be implemented in association with the example presentation user interface(s) (UI) described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 900 starts at operation 902 where the system displays a first UI arrangement showing an original computer state of a user position and audio access permissions. As shown in FIG. 1, a user interface can show user renderings 102 that are arranged in clusters when a subgroup of users are in a private audio and video discussion.

At operation, 904, the system can receive a command to change the state of the computer. This can include a voice command or a device input, such as a pointer device, that indicates a subgroup of users in a discussion, a topic of a discussion, a person in a discussion, or any other information that identifies a discussion and/or the discussion participants.

At operation 906, the system moves a rendering representing a user associated with the input to a position relative to a representation of the subgroup that is related to the identified discussion. An example of this movement is shown in FIG. 2C.

At operation 908, the system modifies access rights for a computing device associated with the user to receive audio signals. In the example of FIG. 2C, the new access rights allow the computer of User A to receive audio signals from computers of users in the selected discussion group.

At operation 910, the system can receive a second command. This may be any form of input indicating that a user, e.g., User A, would like to conduct a full join to the discussion. An example of this input is shown in FIG. 2D.

At operation 912, in response to the second command, the system change the user interface format to show videos of the subgroup to User A. This can be shown with subgroups to allow User A to see that other conversations are active.

At operation 914, the system modifies the access rights, where the new access rights allow the computer of User A to send and receive audio and video signals to and from computers of users in the selected discussion group.

Figure 8:
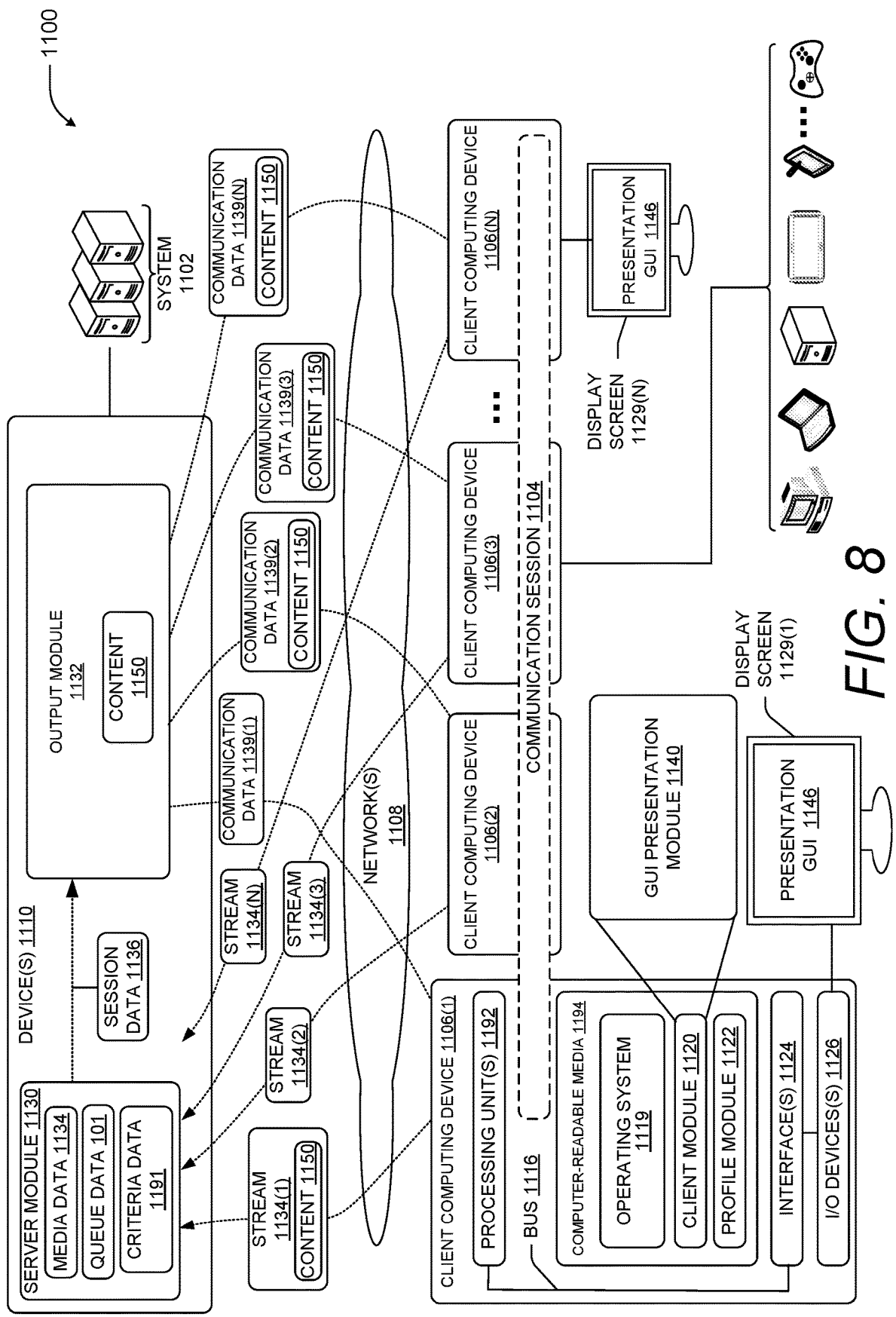
FIG. 8 is a computer architecture diagram illustrating an illustrative computer hardware and software architecture for a computing system capable of implementing aspects of the techniques and technologies presented herein.

FIG. 8 is a diagram illustrating an example environment 1100 in which a system 1102 (which can be system 100 of FIG. 1) can implement the techniques disclosed herein. In some implementations, a system 1102 may function to collect, analyze, and share data defining one or more objects that are displayed to users of a communication session 1104.

As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent configured to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that captures the appearance and speech of a user participating in the communication session). In some implementations, the video feeds may comprise such audio and visual data, one or more still images, and/or one or more avatars. The one or more still images may also comprise one or more avatars.

Another example of an individual stream of live and/or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live and/or recorded content within the communication data enable a remote meeting to be facilitated between a group of people and the sharing of content within the group of people. In some implementations, the various streams of live and/or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee of a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 1106(1) is in some way connected to a display device (e.g., a display screen 1129(1)), which can display a UI according to the techniques described herein.

In the example environment 1100 of FIG. 8, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile modules 1122 to generate participant profiles (not shown in FIG. 8) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening," device such that it only receives content associated with the communication session 1104 but does not provide any content to the communication session 1104. A communication session 1104 can have a start time and an end time, or a communication session 1104 can be ongoing. A communication session 1104 can also be categorized as an event and have stages, with each stage causing a computer to change roles for individual users as an event transitions through each stage.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(N) participating in a live viewing of the communication session). The communication data 1139 may include video, audio, and/or other content data, provided by the output module 1132 based on content 1150 associated with the output module 1132 and based on received session data 1136. The device(s) 1110 of the system 1102 can also access queue data 101 described above in connection with FIG. 1, and criteria data 1191 for defining criteria and/or thresholds described herein. The criteria data 1191 can also include machine learning data accessible by a machine learning service or a machine learning module, which can be part of the server module 1130 or part of a remote machine learning service, such as those that are accessible by a public API at a site run by IBM, Google, or Microsoft.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 of the system 1102 and/or the client module 1120 can include GUI presentation module 1140. The GUI presentation module 1140 may be configured to analyze communication data 1139 that is for delivery to one or more of the client computing devices 1106. Specifically, the UI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the GUI presentation module 1140 may provide video, images, and/or content to a presentation GUI 1146 rendered on the display screen 1129 of the associated client computing device 1106. The presentation GUI 1146 may be caused to be rendered on the display screen 1129 by the GUI presentation module 1140. The presentation GUI 1146 may include the video, images, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, and a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 9:
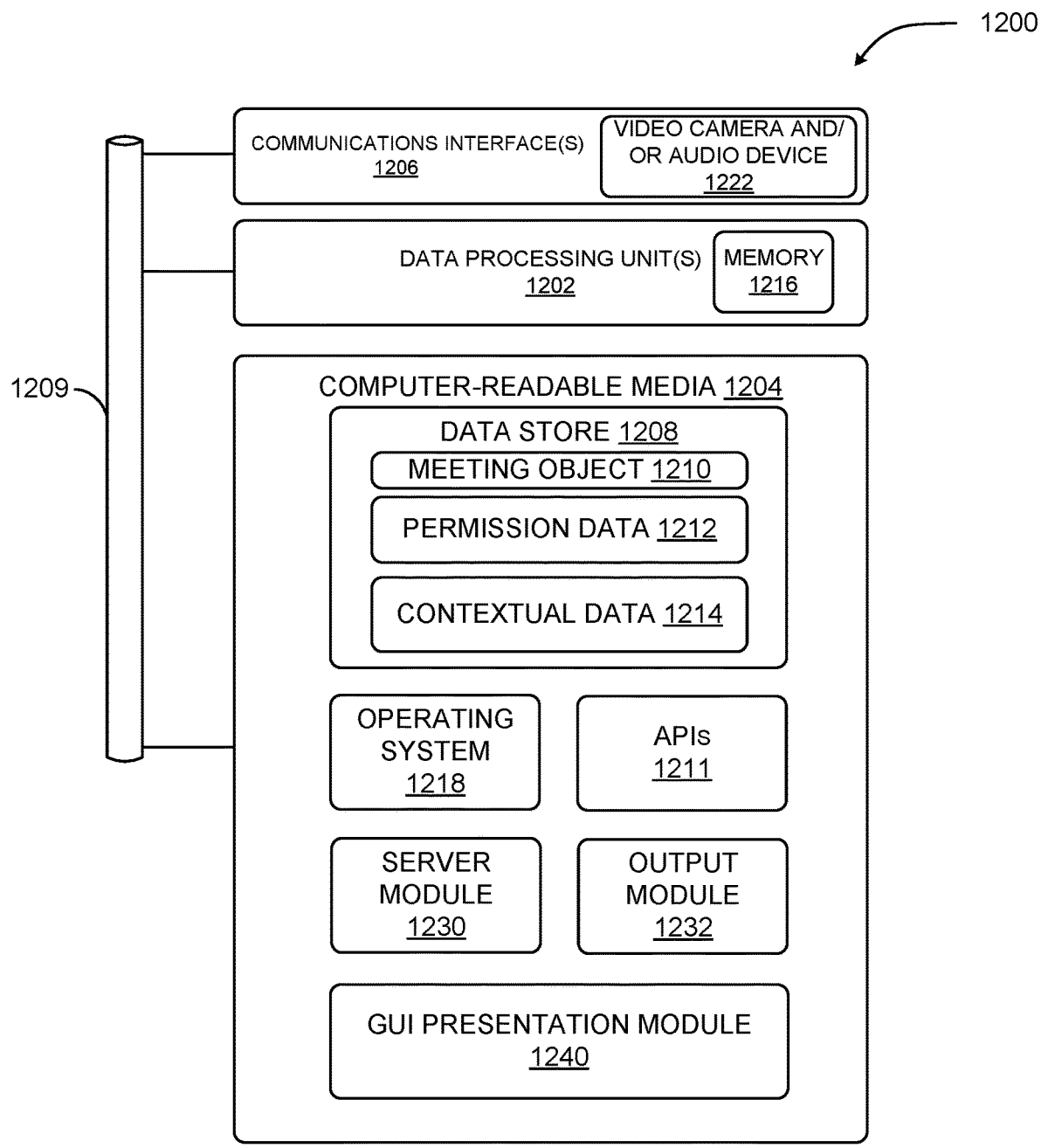
FIG. 9 is a computer architecture diagram illustrating a computing device architecture for a computing device capable of implementing aspects of the techniques and technologies presented herein.

FIG. 9 illustrates a diagram that shows example components of an example device 1200 (also referred to herein as a "computing device") configured to generate and process data for some of the user interfaces disclosed herein. The device 1200 may generate data that may include one or more sections that may render or comprise video, images, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204 (also referred to herein as computer storage medium 1204), and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of digital signal processors ("DSPs"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. "Computer storage media," "non-transitory computer storage media," or "non-transitory computer-readable media" may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media or variants of this term noted above includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or any storage medium that can be used to locally store and maintain information for access at a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store a meeting object 1210, a permission data 1212, and/or other data. The meeting object 1210 can include a total number of participants (e.g., users and/or client computing devices) in a communication session, activity that occurs in the communication session, a list of invitees to the communication session, and/or other data related to when and how the communication session is conducted or hosted. This object can also define subgroups, members of subgroups, and other user information. The permission data 1212 stores all access rights for each user, e.g., whether a computer of a user can receive audio or video streams from specific computers or send or video streams to specific computers. The data store 1208 may also include contextual data 1214, which can include any information that defines the activity of a user, criteria, or thresholds disclosed herein.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof. In addition, the words "that" or "if" can used interchangeably. Thus, a phrase such as "determining that criteria is satisfied" can be also interpreted as "determining if criteria is satisfied" and vice versa.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method, executed by a computing system, for controlling access to audio and video streams of a communication session, the method comprising:
    causing a display of a user interface arrangement comprising a plurality of renderings each associated with individual users of the communication session, the user interface arrangement further comprising clusters each representing individual discussions of subgroups of users, wherein a cluster of renderings represents a discussion between a subset of users that are represented by individual renderings positioned in association with the cluster, the user interface arrangement further comprising a list of individual discussions that are each associated with graphical elements outlining individual clusters representing the individual discussions;
    receiving an input indicating a selection of the discussion by an interaction with a graphical element associated with the discussion under a listen-only mode, wherein the graphical element is positioned in association with a description of the discussion on the list; and
    in response to the input selecting the discussion under the listen-only mode from the list:
    moving a rendering representing a user associated with the input to a position that indicates an association between the rendering representing the user and the cluster of renderings that represents the discussion between the subset of users, and
    modifying access rights for a computing device associated with the user to receive audio signals from computing devices of the subset of users having renderings positioned in association with the cluster, but without transmitting audio signals from the computing device associated with the user to the computing devices of the subset of users.

2. The method of claim 1, further comprising:
    receiving a selection of a second graphical element associated with the discussion, wherein the second graphical element is positioned in association with the description of the discussion on the list; and
    in response to the selection of the second graphical element of the discussion from the list, modifying the access rights for the computing device associated with the user to send audio signals to the computing devices of the subset of users having renderings positioned in association with the cluster.

3. The method of claim 1, further comprising:
    receiving a selection of a second graphical element associated with the discussion, wherein the second graphical element is positioned in association with the description of the discussion on the list; and
    in response to the selection of the second graphical element of the discussion from the list:
    causing a transition from the user interface arrangement comprising the plurality of renderings to a second user interface arrangement comprising individual renderings of the subset of users with the graphical elements outlining the cluster and graphical elements representing other clusters, and
    modifying the access rights for the computing device associated with the user to send audio signals to the computing devices of the subset of users having renderings positioned in association with the cluster.

4. The method of claim 1, further comprising communicating audio signals from computing devices of users participating in other discussion subgroups to the computing device associated with the user, wherein the audio signals from computing devices are concurrently communicated to the computing device associated with the user while a position of the rendering of the user does not have a visual association with the cluster, wherein a first component of the audio signals is from a first cluster of users participating in a first discussion, and a second component of the audio signals is from a second cluster of users participating in a second discussion, wherein a volume of the first component is based on a distance between the rendering of the user and a representation of the first cluster, wherein a volume of the second component is based on a distance between the rendering of the user and a representation of the second cluster.

5. The method of claim 1, wherein moving the rendering representing the user associated with the input comprises: moving the rendering from an original position to the position, wherein the original position indicates that the rendering representing the user does not have a visual association with the cluster of renderings that represents the discussion, wherein the position indicates a visual association between the rendering representing the user and the cluster of renderings that represents the discussion.

6. The method of claim 1, wherein the position of the rendering representing the user further indicates a communication mode of audio signals received from the computing devices of the subset of users.

7. The method of claim 1, wherein the graphical element associated with the discussion comprises selectable options for controlling a communication mode of audio signals of at least one of audio signals received from the computing devices of the subset of users or video signals received from the computing devices of the subset of users.

8. The method of claim 1, wherein modifying access rights for the computing device associated with the user to receive audio signals from computing devices of the subset of users having renderings positioned in association with the cluster is performed without including or adding a representation of the user to the list of users of the subset.

9. A computing device for controlling access to audio and video streams of a communication session, the computing device comprising:
one or more processing units; and
a computer-readable storage medium having encoded thereon computer-executable instructions to cause the one or more processing units to:
cause a display of a user interface arrangement comprising a plurality of renderings each associated with individual users of a communication session, the user interface arrangement further comprising clusters each representing individual discussions of subgroups of users, wherein a cluster of renderings represents a discussion between a subset of users that are represented by individual renderings positioned in association with the cluster, the user interface arrangement further comprising a list of individual discussions that are each associated with graphical elements outlining individual clusters representing the individual discussions;
receive an input indicating a selection of the discussion by an interaction with a graphical element associated with the discussion under a listen-only mode, wherein the graphical element is positioned in association with a description of the discussion on the list;
in response to the input selecting the discussion under the listen-only mode from the list:
move a rendering representing a user associated with the input to a position that indicates an association between the rendering representing the user and the cluster of renderings that represents the discussion between the subset of users, and
modify access rights for a computing device associated with the user to receive audio signals from computing devices of the subset of users having renderings positioned in association with the cluster, but without transmitting audio signals from the computing device associated with the user to the computing devices of the subset of users.

10. The computing device of claim 9, wherein the instructions further cause the one or more processing units to:
receive a selection of a second graphical element associated with the discussion, wherein the second graphical element is positioned in association with the description of the discussion on the list; and
in response to the selection of the second graphical element of the discussion from the list, modify the access rights for the computing device associated with the user to send audio signals to the computing devices of the subset of users having renderings positioned in association with the cluster.

11. The computing device of claim 9, wherein the instructions further cause the one or more processing units to:
receive a selection of a second graphical element associated with the discussion, wherein the second graphical element is positioned in association with the description of the discussion on the list; and
in response to the selection of the second graphical element of the discussion from the list:
cause a transition from the user interface arrangement comprising the plurality of renderings to a second user interface arrangement comprising individual renderings of the subset of users with the graphical elements outlining the cluster and graphical elements representing other clusters, and
modify the access rights for the computing device associated with the user to send audio signals to the computing devices of the subset of users having renderings positioned in association with the cluster.

12. The computing device of claim 9, wherein the input indicating the selection of the discussion comprises receiving an input indicating a topic, wherein the method further comprises: determining that the topic is related to the discussion, wherein moving the rendering representing the user and modifying access rights for the computing device associated with the user to receive audio signals from devices of the subgroup of users in response to determining that the topic is related to the discussion.

13. The computing device of claim 9, wherein the input indicating the selection of the discussion comprises receiving an input indicating an identifier of a discussion participant, wherein the method further comprises: determining that the discussion participant identified in the input is participating in the discussion with a subgroup of users, wherein moving the rendering representing the user and modifying access rights for the computing device associated with the user to receive audio signals from devices of the subgroup of users in response to determining that the discussion participant identified in the input is participating in the discussion with a subgroup of users.

14. The computing device of claim 9, wherein the instructions further cause the one or more processing units to communicate audio signals from computing devices of users participating in other discussion subgroups to the computing device associated with the user, wherein the audio signals from computing devices are concurrently communicated to the computing device associated with the user while a position of the rendering of the user does not have a visual association with the cluster, wherein a first component of the audio signals is from a first cluster of users participating in a first discussion, and a second component of the audio signals is from a second cluster of users participating in a second discussion, wherein a volume of the first component is based on a distance between the rendering of the user and a representation of the first cluster, wherein a volume of the second component is based on a distance between the rendering of the user and a representation of the second cluster.

15. The computing device of claim 9, wherein a location of a source of a first component is based on a location of the rendering of the user relative to a location of the representation of a first cluster, wherein a location of a source of a second component is based on the location of the rendering of the user relative to a location of the representation of a second cluster.

16. A computer-readable storage device having encoded thereon computer-executable instructions to cause the one or more processing units of a system to:
  cause a display of a user interface arrangement comprising a plurality of renderings each associated with individual users of a communication session, the user interface arrangement further comprising clusters each representing individual discussions of subgroups of users, wherein a cluster of renderings represents a discussion between a subset of users that are represented by individual renderings positioned in association with the cluster, the user interface arrangement further comprising a list of individual discussions that are each associated with graphical elements outlining individual clusters representing the individual discussions;
  receive an input indicating a selection of the discussion by an interaction with a graphical element associated with the discussion under a listen-only mode, wherein the graphical element is positioned in association with a description of the discussion on the list;
  in response to the input selecting the discussion under the listen-only mode from the list:
    move a rendering representing a user associated with the input to a position that indicates an association between the rendering representing the user and the cluster of renderings that represents the discussion between the subset of users, and
    modify access rights for a computing device associated with the user to receive audio signals from computing devices of the subset of users having renderings positioned in association with the cluster, but without transmitting audio signals from the computing device associated with the user to the computing devices of the subset of users.

17. The computer-readable storage device of claim 16, wherein the instructions further cause the one or more processing units to:
  receive a selection of a second graphical element associated with the discussion, wherein the second graphical element is positioned in association with the description of the discussion on the list; and
  in response to the selection of the second graphical element of the discussion from the list, modify the access rights for the computing device associated with the user to send audio signals to the computing devices of the subset of users having renderings positioned in association with the cluster.

18. The computer-readable storage device of claim 16, wherein the instructions further cause the one or more processing units to:
  receive a selection of a second graphical element associated with the discussion, wherein the second graphical element is positioned in association with the description of the discussion on the list; and
  in response to the selection of the second graphical element of the discussion from the list:
    cause a transition from the user interface arrangement comprising the plurality of renderings to a second user interface arrangement comprising individual renderings of the subset of users with the graphical elements outlining the cluster and graphical elements representing other clusters, and
    modify the access rights for the computing device associated with the user to send audio signals to the computing devices of the subset of users having renderings positioned in association with the cluster.

19. The computer-readable storage device of claim 16, wherein the input indicating the selection of the discussion comprises receiving an input indicating a topic, wherein the method further comprises: determining that the topic is related to the discussion, wherein moving the rendering representing the user and modifying access rights for the computing device associated with the user to receive audio signals from devices of the subgroup of users in response to determining that the topic is related to the discussion.

20. The computer-readable storage device of claim 16, wherein the input indicating the selection of the discussion comprises receiving an input indicating an identifier of a discussion participant, wherein the method further comprises: determining that the discussion participant identified in the input is participating in the discussion with a subgroup of users, wherein moving the rendering representing the user and modifying access rights for the computing device associated with the user to receive audio signals from devices of the subgroup of users in response to determining that the discussion participant identified in the input is participating in the discussion with a subgroup of users.

* * * * *